(12) United States Patent
Hirano et al.

(10) Patent No.: US 6,382,664 B1
(45) Date of Patent: May 7, 2002

(54) PASSENGER SEAT AIR BAG

(75) Inventors: Tatsuo Hirano, Komaki; Yasushi Okada, Ichinomiya, both of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/642,097

(22) Filed: Aug. 21, 2000

(30) Foreign Application Priority Data

Aug. 31, 1999 (JP) ............................................ 11-246129
Mar. 17, 2000 (JP) ....................................... 2000-076798

(51) Int. Cl.$^7$ ............................................. B60R 21/22
(52) U.S. Cl. .................. 280/730.2; 280/742; 280/743.1
(58) Field of Search ........................... 280/728.1, 728.3, 280/732, 731, 742, 743.1, 743.2, 740, 729

(56) References Cited

U.S. PATENT DOCUMENTS

| | | | | |
|---|---|---|---|---|
| 4,500,114 A | * | 2/1985 | Grey, Jr ...................... | 280/742 |
| 5,172,933 A | * | 12/1992 | Strasser ...................... | 280/740 |
| 5,240,283 A | * | 8/1993 | Kishi et al. ................. | 280/729 |
| 5,427,410 A | * | 6/1995 | Shiota et al. ............. | 280/743.1 |
| 5,573,270 A | * | 11/1996 | Sogi et al. .................. | 280/740 |
| 5,913,535 A | * | 6/1999 | Taguchi et al. ............. | 280/729 |
| 5,951,038 A | * | 9/1999 | Taguchi et al. ............. | 280/729 |

FOREIGN PATENT DOCUMENTS

| JP | 07-291068 | 11/1995 |
|---|---|---|
| JP | 09-030352 | 2/1997 |

\* cited by examiner

*Primary Examiner*—Paul N. Dickson
*Assistant Examiner*—Faye M. Fleming
(74) *Attorney, Agent, or Firm*—Pillsbury Winthrop LLP

(57) ABSTRACT

A passenger seat air bag has a bottom wall portion having an aperture portion for inflating gas inlet, and a ceiling wall portion. The air bag is shaped into a bag in which outer circumferential edges of the bottom wall portion and the ceiling wall portion are coupled with each other. At the beginning of folding, while the state where the bottom wall portion and the ceiling wall portion are put on top of each other and unfolded to be flat is kept, a coupling portion on the vehicle front side where the outer circumferential edges of the bottom wall portion and the ceiling wall portion are coupled with each other is shifted toward the vehicle rear side. In that state, the air bag is folded and received in a portion of an instrument panel so that the circumferential edges thereof are close to the aperture portion. In another air bag, a flow control cloth is disposed inside an air bag body so as to cover the gas inlet and change the flow of inflating gas flowing in through the gas inlet. The flow control cloth is disposed to cover the gas inlet in the left/right direction of a vehicle, and arranged so that the flow rate of inflating gas flowing toward the front side of a substantially middle portion in the front/rear direction of the flow control cloth is made higher than the flow rate of inflating gas flowing toward the rear side thereof.

5 Claims, 30 Drawing Sheets

VIEW IN DIRECTION V

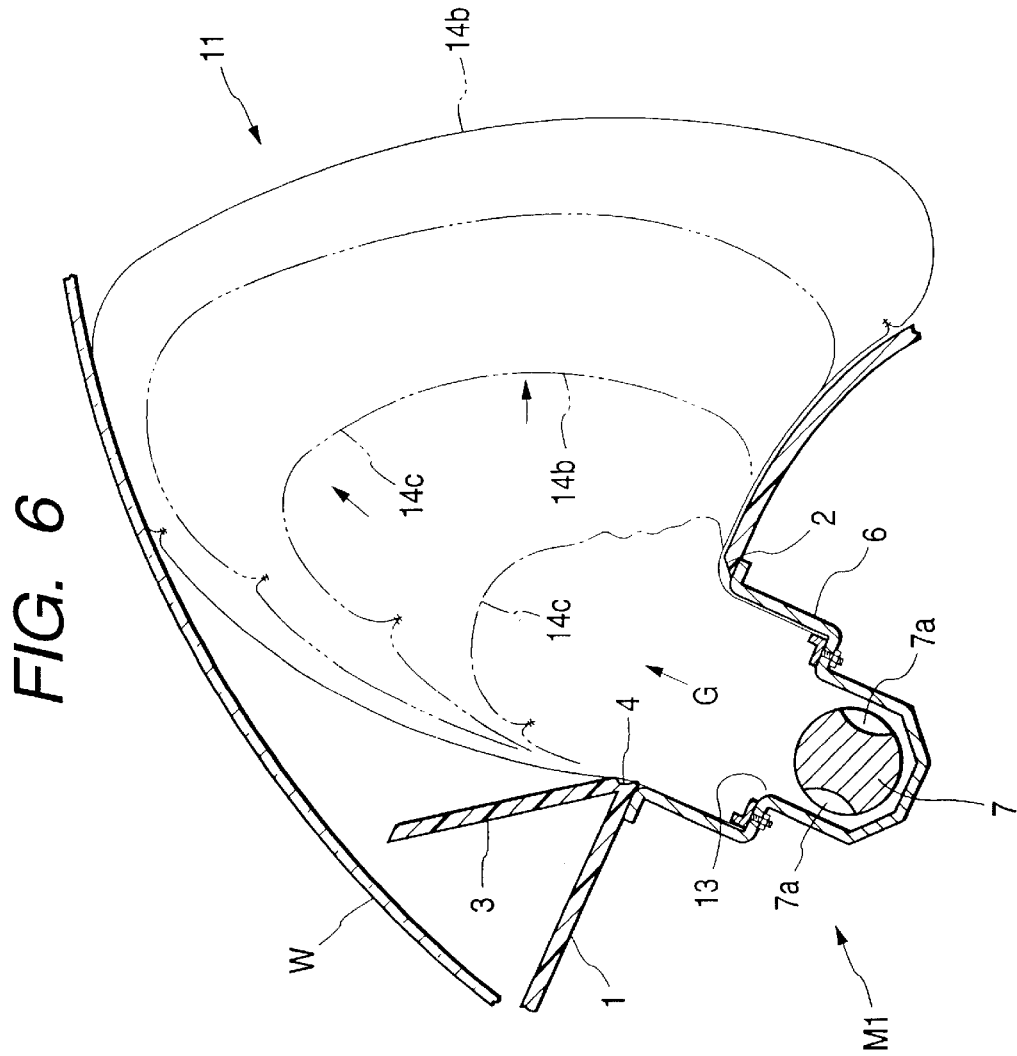

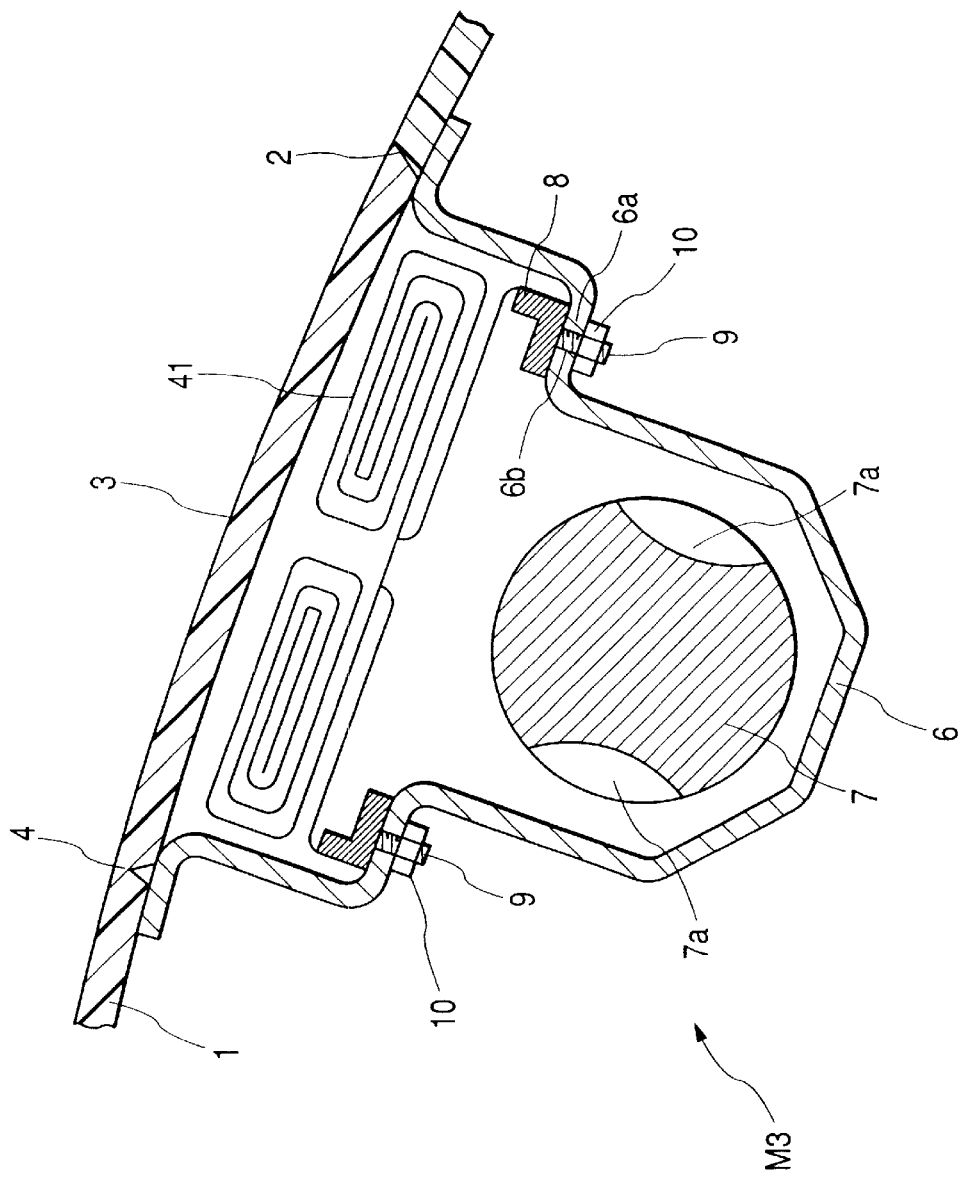

← VEHICLE FRONT SIDE     VEHICLE REAR SIDE →

PASSENGER SEAT AIR BAG

BACKGROUND OF THE INVENTION

1. Field of the Invention

The present invention relates to a passenger seat air bag, and particularly relates to a so-called planar air bag for a passenger seat comprising a bottom wall portion having an aperture portion for inflating gas inlet; and a ceiling wall portion having an outer shape substantially the same as that of the bottom wall portion and disposed in opposition to the bottom wall portion; wherein outer circumferential edges of the bottom wall portion and the ceiling wall portion are coupled with each other so as to form a bag.

2. Description of the Related Art

In the background art, such a planar air bag for a passenger seat had two fabric sheets of a bottom wall portion having an aperture portion for inflating gas inlet, and a ceiling wall portion disposed in opposition to the bottom wall portion, the outer circumferential edges of the bottom wall portion and the ceiling wall portion being coupled with each other so as to form a bag, as disclosed in the publication of Unexamined Japanese Patent Publication Hei. 7-291068.

Such a passenger seat planar air bag was folded and received as follow. First, the bottom wall portion and the ceiling wall portion were put on top of each other so that the air bag was unfolded to be flat. Then, the air bag was folded so that the circumferential edges were made close to the aperture portion. Thus, the air bag was received in a case of the passenger seat air bag system, and the case was disposed in a portion of an instrument panel.

Incidentally, in the air bag disclosed in the above publication, the aperture portion provided in the bottom wall portion was offset toward the vehicle rear side so that the projection quantity toward the vehicle rear side when the air bag had finished inflating was increased by the interference with a wind shield.

However, in the case where the aperture portion for inflating gas inlet is disposed substantially at the center of the bottom wall portion differently from the above publication, if the bottom wall portion and the ceiling wall portion are put on top of each other so that the air bag is unfolded to be flat, and if the air bag is folded so that the outer circumferential edges of the bottom and ceiling wall portions are made close to the aperture portion, the vicinity of the center of the ceiling wall portion in opposition to the aperture portion inflates partially so as to project toward the vehicle rear side at the beginning of inflating. Particularly, the vicinity of the center of the ceiling wall portion is apt to project away from the vicinities of the outer circumferential edges sewed with each other. Thus, the distance with which the air bag projects partially at the beginning of inflating becomes long. Then, if a passenger is bound in the middle of the inflating, high pressure is given to the passenger because the projecting portion projects not over a wide area but partially.

Further, in the background art, an air bag used in a passenger seat air bag system was expected to move backward in the state where it was unfolded in a wide area so as to be a substantially vertical plane when it was unfolded and inflated (refer to Unexamined Japanese Patent Publication No. Hei. 11-278192, or the like).

However, in a top mount type passenger seat air bag system disposed on the top surface of an instrument panel in front of a passenger seat, in such a case where a child was close to the instrument panel, an air bag might be expected to be unfolded quickly along the passenger seat side surface of the instrument panel, that is, along the rear surface of the instrument panel from the top surface thereof at the beginning when the air bag was unfolded and inflated, so that a portion of the air bag was disposed between the child and the rear surface of the instrument panel.

SUMMARY OF THE INVENTION

It is therefore an object of the present invention to solve the foregoing problems, that is, to provide a passenger seat air bag in which, though the air bag is a planar one having an aperture portion for inflating gas inlet disposed substantially at the center of a bottom wall portion, the air bag is restrained from projecting partially at the beginning of inflating so that a passenger can be bound with a wide area even if the passenger is bound in the middle of the inflating.

It is another object of the present invention to solve the forgoing problems, that is, to provide a passenger seat air bag which can be unfolded quickly along a passenger seat side surface of an instrument panel at the beginning when the air bag is unfolded and inflated.

According to a first aspect of the present invention, there is provided a passenger seat air bag comprising a bottom wall portion having an aperture portion for inflating gas inlet provided substantially at a center of the bottom wall portion, and a ceiling wall portion having an outer shape substantially the same as that of the bottom wall portion and disposed in opposition to the bottom wall portion, respective outer circumferential edges of the bottom and ceiling wall portions being coupled with each other so as to form a bag, the air bag being folded in a state where the bottom wall portion and the ceiling wall portion are put on top of each other so that the air bag is unfolded to be flat, the folded air bag being received in a portion of an instrument panel so that the circumferential edges are made close to the aperture portion, wherein at the beginning of folding, while the state where the bottom wall portion and the ceiling wall portion are put on top of each other so that the air bag is unfolded to be flat is kept, a coupling portion on the vehicle front side where the bottom wall portion and the ceiling wall portion are coupled with each other is shifted toward the vehicle rear side, and the air bag is folded and received in this state so that the circumferential edges are made close to the aperture portion.

According to a second aspect of the present invention, there is provided a passenger seat air bag comprising a bottom wall portion having an aperture portion for inflating gas inlet provided substantially at a center of the bottom wall portion, and a ceiling wall portion having an outer shape substantially the same as that of the bottom wall portion and disposed in opposition to the bottom wall portion, respective outer circumferential edges of the bottom and ceiling wall portions being coupled with each other so as to form a bag, the air bag being folded in a state where the bottom wall portion and the ceiling wall portion are put on top of each other so that the air bag is unfolded to be flat, the folded air bag being received in a portion of an instrument panel so that the circumferential edges are made close to the aperture portion, wherein the air bag further comprises a band-like tether for generating tension in the air bag at the time of inflating so as to restrain the shape of the air bag upon completion of the inflating, the tether being disposed in the air bag in a manner so that one end portion of the tether is coupled with a rear edge of the bottom wall portion on the vehicle rear side in a circumferential edge of the aperture portion, while the other end portion of the tether is coupled with a position on the vehicle front side of the center vicinity of the ceiling wall portion.

According to a third aspect of the present invention, there is provided a passenger seat air bag used in a passenger seat air bag system disposed on a top surface of an instrument panel in front of a passenger seat in a vehicle, the air bag comprising a gas inlet disposed substantially along a horizontal plane, and a flow control cloth provided inside a body of the air bag so as to cover the gas inlet for changing a flow of inflating gas allowed to flow in through the gas inlet, wherein the flow control cloth is disposed so as not only to cover the gas inlet in a left/right direction of the vehicle but also to make a flow rate of the inflating gas flowing toward a rear side higher than a flow rate of the inflating gas flowing toward a front side with respect to a substantially middle portion in a front/rear direction of the flow control cloth.

In the above passenger seat air bag according to the third aspect of the present invention, in order to make the flow rate of the inflating gas flowing toward the front side lower than the flow rate of the inflating gas flowing toward the rear side thereof with respect to the substantially middle portion in the front/rear direction of the flow control cloth, the flow control cloth is disposed so that left and right edges of the flow control cloth are coupled with a circumferential edge of the gas inlet in an inner circumferential surface of the air bag body while front and rear edges of the flow control cloth are not coupled with the air bag body, and gas communication holes for allowing the inflating gas to pass therethrough may be disposed in the left and right sides of the rear edge of the flow control cloth.

In the above passenger seat air bag according to the third aspect of the present invention, in order to make the flow rate of the inflating gas flowing toward the front side lower than the flow rate of the inflating gas flowing toward the rear side thereof with respect to the substantially middle portion in the front/rear direction of the flow control cloth, the flow control cloth is disposed so that left and right edges and a front edge of the flow control cloth are coupled with a circumferential edge of the gas inlet in an inner circumferential surface of the air bag body while a rear edge of the flow control cloth is not coupled with the air bag body, and gas communication holes for allowing the inflating gas to pass therethrough are disposed, respectively, between each of the left and right edges of the flow control cloth near the front edge and the air bag body or in vicinities of left and right sides near the front edge of the flow control cloth itself.

In the above passenger seat air bag according to the third aspect of the present invention, the rear edge of the flow control cloth is connected, through a connecting belt, with a rear edge of the circumferential edge of the gas inlet in the air bag body so that forward movement of the inflating gas can be restricted when the inflating gas flows in through the gas inlet.

In the passenger seat air bag according to the first aspect of the present invention, the portion of the ceiling wall portion in opposition to the aperture portion projects first when inflating gas flows into the air bag through the aperture portion of the bottom wall portion.

In the air bag according to the first aspect of the present invention, however, the coupling portion on the vehicle front side where the outer circumferential edges of the bottom wall portion and the ceiling wall portion are coupled with each other is shifted toward the vehicle rear side at the beginning of folding. Thus, the portion of the ceiling wall portion in opposition to the aperture portion is away from the vicinity of the center of the ceiling wall portion, and close to the vicinity of the coupling portion on the vehicle front side where the outer circumferential edges of the bottom wall portion and the ceiling wall portion are coupled with each other. As a result, the initial projecting quantity at the beginning of the inflating can be restrained.

In addition, since the vicinity of the center of the ceiling wall portion which is apt to inflate is shifted toward the vehicle rear side at the beginning of folding, the vicinity of the center of the ceiling wall portion which is apt to inflate also starts to project toward the rear side in the middle of the inflating. Thus, the vicinity of the center of the ceiling wall portion together with the portion initially projecting at the beginning of the inflating projects toward the rear side over a wide area.

Further, when the vicinity of the center of the ceiling wall portion shifted toward the vehicle rear side at the beginning of folding starts to project to the rear side, a moment to rotate the ceiling wall portion toward the rear side acts on the air bag so that the portion initially projecting at the beginning of the inflating and the vicinity of the center of the ceiling wall portion become substantially parallel with a vertical plane.

Thus, in the passenger seat air bag according to the first aspect of the present invention, though the air bag is a planar one having an aperture portion for inflating gas inlet disposed substantially at the center of a bottom wall portion, the air bag can be restrained from projecting partially at the beginning of inflating so that a passenger can be bound with a wide vertical area even if the passenger is bound in the middle of the inflating. It is therefore possible to reduce the pressure given to the passenger.

In the passenger seat air bag according to the second aspect of the present invention, when inflating gas flows into the air bag through the aperture portion, the inflating gas is guided by the tether so as to flow from the vicinity of the center of the ceiling wall portion toward the vehicle front side and hence makes the portion where the inflating gas flows project.

However, the projecting portion is regulated by the tether so as not to project not more than the length of the tether let out. Thus, the initial projecting quantity at the beginning of the inflating is restrained.

Moreover, the vicinity of the center of the ceiling portion which is apt to inflate also starts to project backward and projects backward over a wide area together with the portion initially projecting at the beginning of the inflating.

Further, the tether is disposed so as to be coupled between the rear circumferential edge of the aperture portion of the bottom wall portion at the vehicle rear side and the portion of the vicinity of the center of the ceiling wall portion at the vehicle front side so as to cover the vehicle rear side of the aperture portion. Thus, if the inflating gas interferes with the tether, the tether gives the air bag a moment to rotate the ceiling wall portion toward the rear side. As a result, the portion initially projecting at the beginning of the inflating and the vicinity of the center of the ceiling wall portion become substantially parallel with a vertical plane.

Therefore, also in the passenger seat air bag according to the second aspect of the present invention, though the air bag is a planar one having an aperture portion for inflating gas inlet disposed substantially at the center of a bottom wall portion, the air bag can be restrained from projecting partially at the beginning of inflating so that a passenger can be bound with a wide vertical area even if the passenger is bound in the middle of the inflating. It is therefore possible to reduce the pressure given to the passenger.

In the passenger seat air bag according to the third aspect of the present invention, the flow control cloth is disposed in the left/right direction of the vehicle so as to cover the gas inlet. As a result, when the air bag is unfolded and inflated, the flow rate of the inflating gas flowing toward the rear side of the approximately middle portion in the front/rear direction of the flow control cloth becomes higher than the flow rate of the inflating gas flowing toward the front side thereof. Thus, the lower portion of the air bag is easy to deploy along the rear surface of the instrument panel from the top surface thereof.

As a result, the passenger seat air bag according to the present invention can be unfolded quickly along the passenger seat side surface of the instrument panel at the beginning when the air bag is unfolded and inflated.

In the air bag according to the third aspect of the present invention, the gas communication holes for allowing the inflating gas to pass therethrough are disposed, respectively, on the left and right sides of the rear edge of the flow control cloth itself. As a result, when the lower portion of the air bag is deployed along the rear surface of the instrument panel from the top surface thereof at the beginning when the air bag is unfolded and inflated, the lower portion of the air bag can be unfolded with a broad width in the left/right direction.

In the air bag according to the third aspect of the present invention, substantially the three sides except the rear edge, that is, the front side and the left and right sides of the flow control cloth are coupled with the air bag body except the gas communication holes near the left and right sides of the front edge of the air bag body. As a result, at the beginning when the air bag is unfolded and inflated, the flow control cloth is first inflated like a bag, and next a large quantity of the inflating gas flows from the rear edge of the flow control cloth to the lower portion of the air bag. At that time, an air bag cover covering the folded air bag can be opened smoothly when the flow control cloth is inflated like a bag. Next in that state, a large quantity of the inflating gas flows to the lower portion of the air bag so that the lower portion of the air bag deploys along the rear surface of the instrument panel from the top surface thereof more easily. As a result, the air bag can be unfolded more quickly along the passenger seat side surface of the instrument panel at the beginning when the air bag is unfolded and inflated.

Further, in the air bag according to the third aspect of the present invention, the forward movement of the rear edge of the flow control cloth is restricted by the connecting belt which is connected to the circumferential edge of the gas inlet. Accordingly, when the inflating gas flows in, it is possible to avoid such a state that the flow control cloth is turned over forward so as to open the gas inlet directly in the air bag body. As a result, the flow rate of the inflating gas flowing backward can be made stably higher than the flow rate of the inflating gas flowing forward.

Features and advantages of the invention will be evident from the following detailed description of the preferred embodiments described in conjunction with the attached drawings.

BRIEF DESCRIPTION OF THE DRAWINGS

In the accompanying drawings:

FIG. 6 shows a sectional view showing the same embodiment when the air bag is inflated;

FIG. 14 shows a sectional view showing the state where the cubic air bag shown in FIG. 11 is folded and received in a vehicle;

DETAILED DESCRIPTION OF THE PREFERRED EMBODIMENTS.

Embodiments of the present invention will be described below with reference to the drawings.

Figure 1:
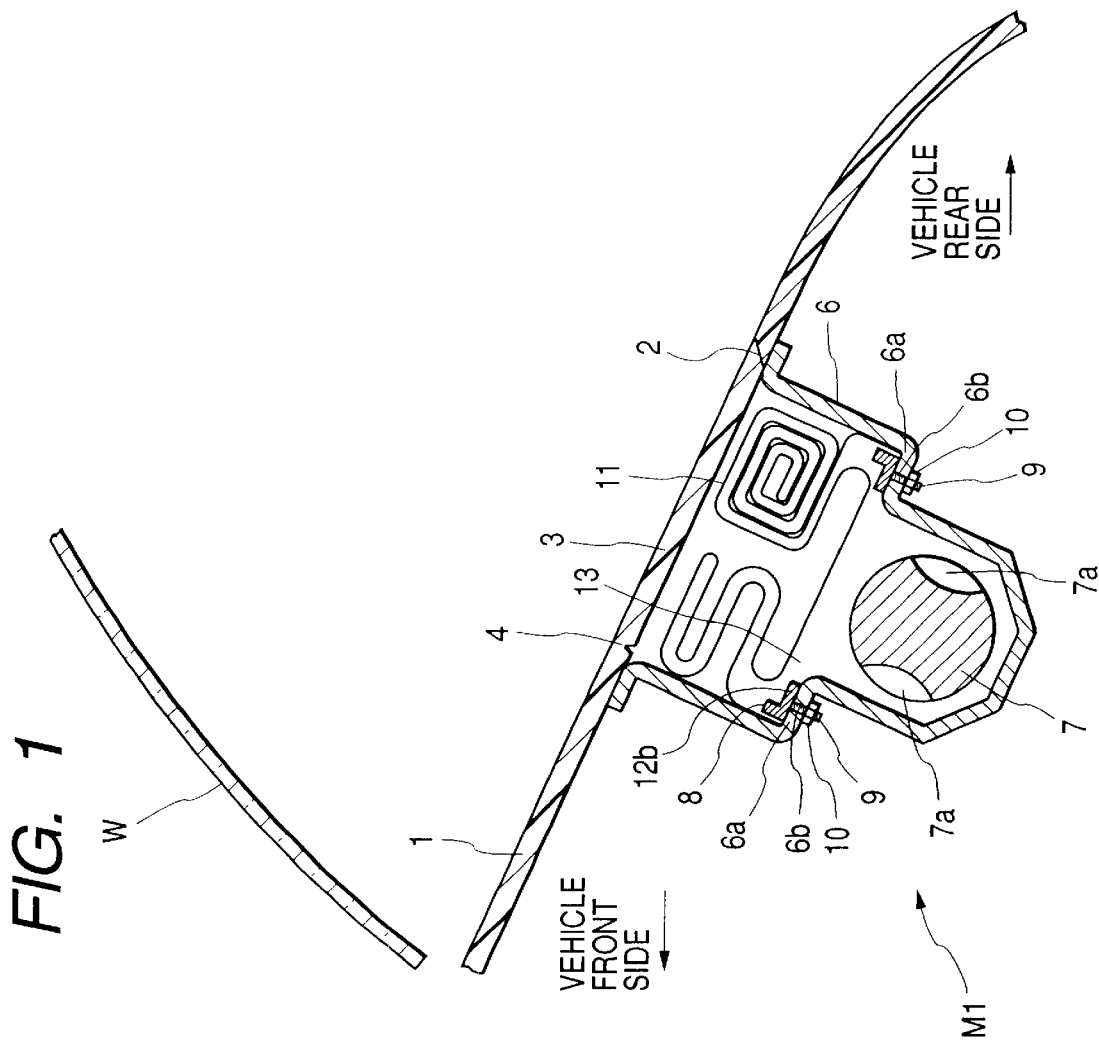
FIG. 1 shows a longitudinal sectional view in the vehicle front/rear direction of a passenger seat air bag system using an air bag in a first embodiment according to the present invention.

As shown in FIG. 1, a passenger seat air bag 11 in a first embodiment of the present invention is used in a top mount type passenger seat air bag system M1 which is disposed on the top side of an instrument panel 1. This passenger seat air bag system M1 is constituted by the air bag 11, an inflator 7 for supplying inflating gas into the air bag 11, and a case 6 for holding the folded air bag 11 and the inflator 7.

The case 6 is formed of a metal plate into a box-like shape having an open top, a step portion 6a and a not-shown bracket for fixedly connecting the case 6 to a predetermined portion of a vehicle. Viewed from the top, the step portion 6a is formed like a quadrilateral ring which will be a portion connecting an aperture-portion's circumferential edge 12b of the air bag 11 which will be described later. The step portion 6a is provided with a plurality of through holes 6b for inserting bolts 9 of a retainer 8.

The inflator 7 is of a cylinder type with a gas outlet 7a, and the opposite ends of the inflator 7 are fixedly attached to the circumferential wall of the case 6.

In the top of the instrument panel 1, a rectangular aperture 2 is formed in a portion in front of a passenger seat. In addition, a door 3 supported by a hinge portion 4 is disposed over the aperture 2. The door 3 is configured so that when the air bag 11 is inflated, the door 3 is pushed by the air bag 11 so as to rotate about the hinge portion 4 and open toward the vehicle front side (see FIG. 6).

Figure 2:
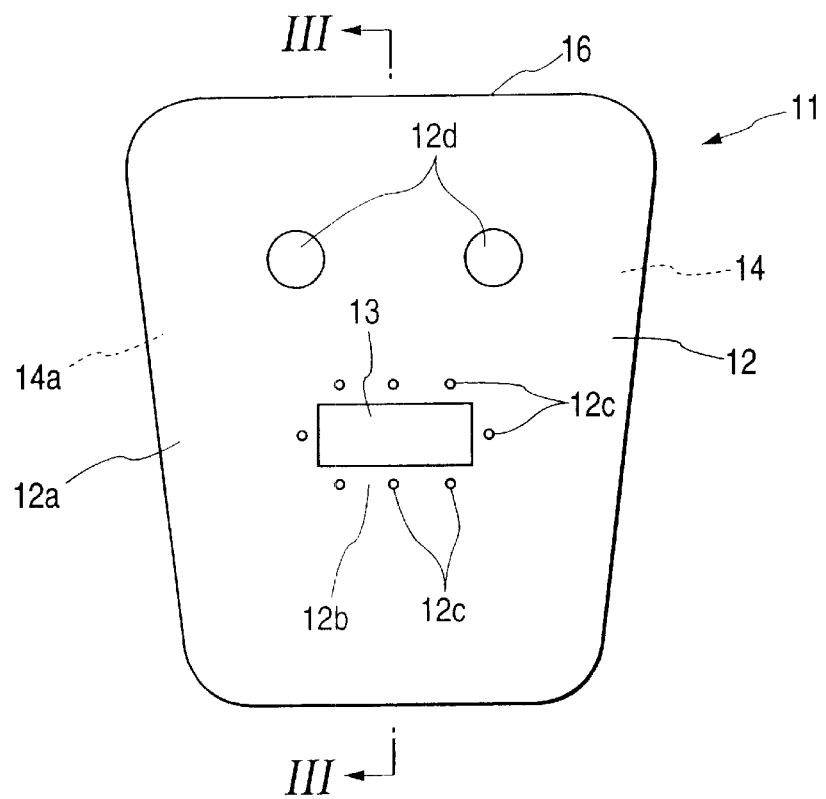
FIG. 2 shows a view in which the air bag in the same embodiment is viewed from the bottom wall portion thereof when the air bag is unfolded to be flat before being folded.
Figure 3:
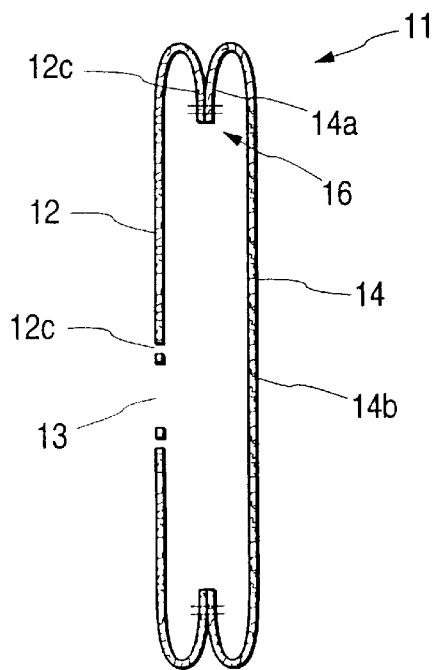
FIG. 3 shows an end view taken on line III—III of FIG. 2.

The air bag 11 is shaped into a bag in which respective outer circumferential edges 12a and 14a of two rectangular sheets of a bottom wall portion 12 and a ceiling wall portion 14 having the same outer shape are sewed with each other, as shown in FIGS. 2 and 3. The bottom wall portion 12 and the ceiling wall portion 14 are composed of woven fabric using polyester yarn, polyamide yarn, or the like. The portions of the bottom wall portion 12 and the ceiling wall portion 14 which will become the surfaces of the inner circumferential side of the air bag 11 may be provided with a heat-resistant coating layer of silicon or the like in compliance with request. Incidentally, the ceiling wall portion 14 will become a portion on the side where a passenger is bound when the air bag 11 is inflated.

The bottom wall portion 12 has an aperture portion 13 at its center. The aperture portion 13 is opened in the form of a quadrilateral. At the circumferential edge 12b of the aperture portion 13, a plurality of through holes 12c are formed correspondingly to the positions of the respective through holes 6b in the step portion 6a of the case 6. In addition, vent holes 12d for discharging surplus inflating gas are formed in the bottom wall portion 12. The aperture-portion's circumferential edge 12b is pressed by the retainer 8 while the respective bolts 9 of the retainer 8 penetrating the through holes 12c of the air bag 11 and the through holes 6b of the case step portion 6a are fixed with nuts 10. Thus, the aperture-portion's circumferential edge 12b is fixedly attached to the case step portion 6a.

Then, when the air bag system M1 of the top mount type for the passenger seat is disposed on the top side of the instrument panel 1, the aperture-portion's circumferential edge 12b and the aperture portion 13 of the air bag 11 are disposed in a substantially horizontal plane which is slightly inclined down on the vehicle rear side.

Incidentally, the retainer 8 is formed of a metal plate and shaped into a quadrilateral ring with a plurality of bolts 9 extending downward.

To manufacture the air bag 11, the bottom wall portion 12 and the ceiling wall portion 14 are prepared. Then, the respective portions of the bottom wall portion 12 and the ceiling wall portion 14 which will become the outer circumferences of the air bag 11 are brought into contact with each other so that the bottom wall portion 12 and the ceiling wall portion 14 are put on top of each other. The respective outer circumferential edges 12a and 14a of the bottom wall portion 12 and the ceiling wall portion 14 are sewed with each other. Next, the air bag 11 sewed up is turned inside out by use of the aperture portion 13 so that a margin to sew up should not be exposed to the outer circumferential side. In such a manner, the air bag 11 can be manufactured.

After the air bag 11 is manufactured, the retainer 8 is put into the air bag 11 by use of the aperture portion 13, and further the respective bolts 9 are projected from the through holes 12c. Next, the air bag 11 is folded.

Figure 4A:
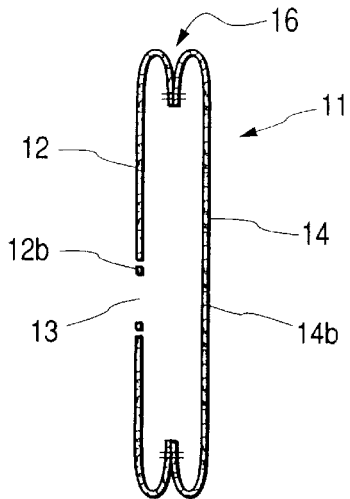
FIGS. 4A to 4D show views for explaining a process of folding in the same embodiment.
Figure 4B:
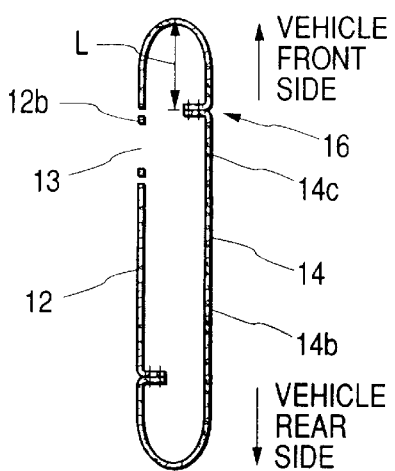
Figure 4C:
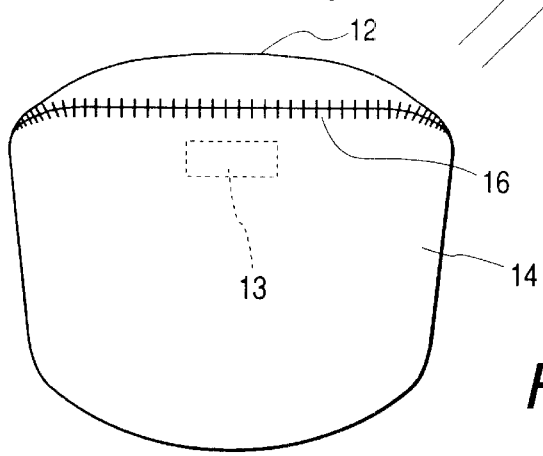

In this folding, first, the bottom wall portion 12 and the ceiling wall portion 14 are put on top of each other so that the air bag 11 is unfolded to be flat, as shown in FIG. 4A. Next, while the state where the air bag 11 is unfolded to be flat is kept, a coupling portion 16 on the vehicle front side where the outer circumferential edges of the bottom wall portion 12 and the ceiling wall portion 14 are coupled with each other is shifted toward the vehicle rear side, as shown in FIGS. 4B and 4C. The distance L with which the coupling portion 16 is shifted is set suitably within a range where the coupling portion 16 is opposite to the aperture portion 13 after that, the air bag 11 is folded so that the circumferential edges are close to the aperture portion 13.

The vehicle front side and the vehicle rear side mean not real directions in the working of folding but directions with respect to the aperture portion 13 when the air bag 11 is mounted on a vehicle.

Figure 4D:
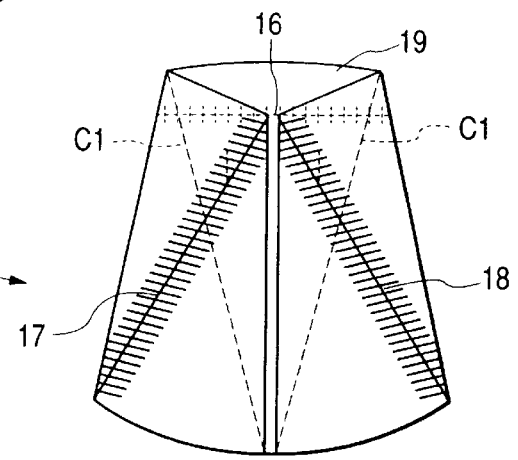

In the case of the first embodiment, the circumferential edges of the air bag 11 are folded toward the aperture portion 13 as follows. First, in the vicinities of the left and right coupling portions 17 and 18 where the respective outer circumferential edges of the bottom wall portion 12 and the ceiling wall portion 14 are coupled with each other, the circumferential edges are creased with creases C1 and C2 and folded toward the ceiling wall portion 14 while the bottom wall portion 12 and the ceiling wall portion 14 are separated from each other, as shown in FIG. 4D. At this time, the coupling portions 17 and 18 are disposed so as to be close to each other on the vehicle front side.

Figure 5A:
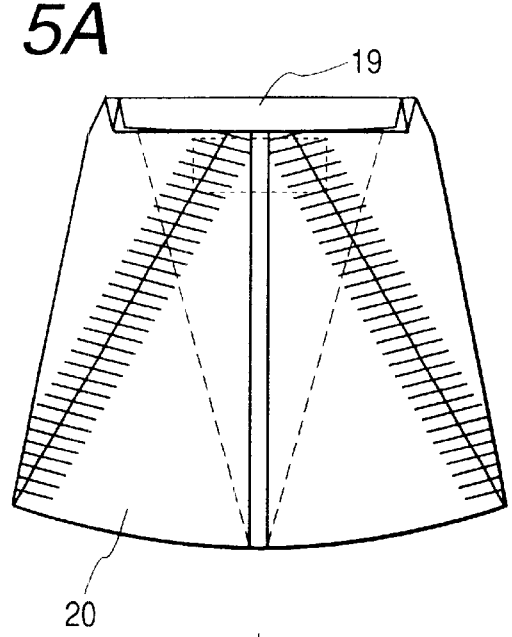
FIGS. 5A to 5C show views for explaining the process of folding follows FIG. 4 in the same embodiment.
Figure 5B:
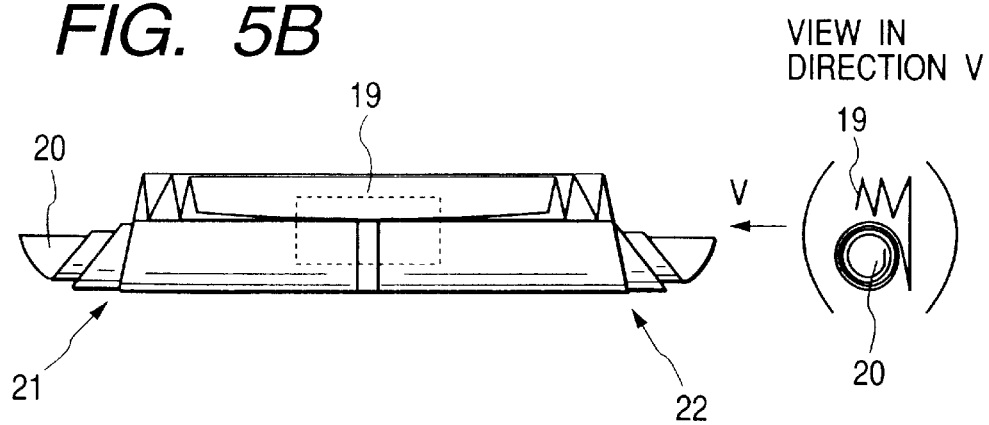

After that, a circumferential edge 19 on the vehicle front side is folded in the form of bellows so as to be close to the aperture portion 13 on the ceiling wall portion 14 side as shown in FIG. 5A. Further, a circumferential edge 20 on the vehicle rear side is involution-rolled as shown in FIG. 5B. The inward roll-folding is a way of folding in which the circumferential edge 20 is rolled so as to come close to the aperture portion 13 on the bottom wall portion 12, and put on the ceiling wall portion 14.

Figure 5C:
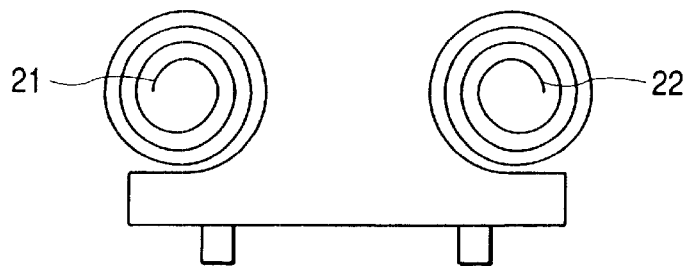

Next, left and right circumferential edges 21 and 22 are involution-rolled respectively as shown in FIG. 5C. That is, the circumferential edges 21 and 22 are rolled so as to come close to the aperture portion 13 on the bottom wall portion 12, and put on the ceiling wall portion 14 respectively. In such a manner, the working of folding the air bag 11 can be completed.

Then, after the air bag 11 is folded up, the respective bolts 9 are passed through the through holes 6b in the step portion 6a of the case 6 fixedly attached to the inflator 7, and fixed with the nuts 10. Thus, the air bag 11 can be attached to the case 6. Furthermore, the case 6 is connected to a predetermined portion of the vehicle by use of a not-shown bracket extending from the case 6. Thus, the air bag system M1 can be mounted on the vehicle while it is disposed under the instrument panel 1.

If inflating gas G is discharged from the gas outlet 7a of the inflator 7 after the air bag system M1 is mounted on the vehicle, the air bag 11 allows the inflating gas G to flow in through the aperture portion 13. As a result, the air bag 11 inflates and pushes the door 3 open. The air bag 11 projects from an aperture 2 of the instrument panel 1, interferes with a wind shield W, and projects backward on a large scale, as shown in FIG. 6.

At that time, in the air bag 11 of the first embodiment, when the inflating gas G flows into the air bag 11 through the aperture portion 13 of the bottom wall portion 12, a portion 14c (see FIG. 4B) of the ceiling wall portion 14 in opposition to the aperture portion 12 first projects as shown by the one-dot chain line in FIG. 6.

In the air bag 11 of the first embodiment, however, as shown in FIGS. 4B and 4C, the coupling portion 16 on the vehicle front side where the outer circumferential edges 12a and 14a of the bottom wall portion 12 and the ceiling wall portion 14 are coupled with each other is shifted toward the vehicle rear side at the beginning of folding. As a result, the portion 14c of the ceiling wall portion 14 in opposition to the aperture portion 13 is away from a center vicinity 14b of the ceiling wall portion 14, and close to the vicinity of the coupling portion 16 on the vehicle front side where the outer circumferential edges 12a and 14a of the bottom wall portion 12 and the ceiling wall portion 14 are coupled with each other. Accordingly, it is possible to restrain the initial projecting quantity at the beginning of inflating.

In addition, since the center vicinity 14b of the ceiling wall portion 14 which is apt to inflate is shifted toward the vehicle rear side at the beginning of folding, the center vicinity 14b apt to inflate also starts to project backward in the middle of the inflating. As a result, the center vicinity 14b projects backward over a wide area together with the portion 14c projecting initially at the beginning of the inflating.

Further, when the center vicinity 14b shifted toward the vehicle rear side at the beginning of folding starts to project backward, such a moment that the ceiling wall portion 14 is rotated backward is made to act on the air bag 11 so that the portion 14 projecting initially at the beginning of the inflating and the ceiling wall portion center vicinity 14b become substantially parallel with a vertical plane respectively as shown by the two-dot chain line and the three-dot chain line in FIG. 6.

As a result, in the passenger seat air bag 11 of the first embodiment, even if the air bag is an planar one having the aperture portion 13 for inflating gas inlet disposed substantially at the center of the bottom wall portion 12, the air bag 11 is restrained from projecting partially at the beginning of inflating. It is therefore possible to bind a passenger with a wide vertical plane even if the passenger is bound in the middle of the inflating, so that it is possible to reduce the pressure to be given to the passenger.

In the first embodiment, there is shown a case where the coupling portion 16 on the vehicle front side where the outer circumferential edges 12a and 14a of the bottom wall portion 12 and the ceiling wall portion 14 are coupled with each other is shifted toward the vehicle rear side, whereafter the left and right coupling portions 17 and 18 are folded so as to come close to the aperture portion, further whereafter the edge 19 on the vehicle front side is folded in the form of bellows, and the edge on the vehicle rear side is involution-rolled. However, any folding manner may be used only if the coupling portion 16 on the vehicle front side where the outer circumferential edges 12a and 14a of the bottom wall portion 12 and the ceiling wall portion 14 are coupled with each other is shifted toward the vehicle rear side, and thereafter the circumferential edges are folded so as to come close to the aperture portion 13.

For example, after the coupled portion 16 is shifted toward the vehicle rear side, the left and right sides may be revolution-rolled (in such a folding way that the circumferential edges are rolled simply so as to come close to the aperture portion 13 on the ceiling wall portion 14 side), involution-rolled, and folded in the form of bellows, and next the opposite edges on the vehicle front side and on the vehicle rear side may be suitably revolution-rolled, involution-rolled, and folded in the form of bellows.

Alternatively, after the coupling portion 16 is shifted toward the vehicle rear side, the opposite edges in the front/rear direction of the vehicle may be suitably revolution-rolled, involution-rolled, and folded in the form of bellows, and next the opposite edges in the left/right direction of the vehicle may be suitably revolution-rolled, involution-rolled, and folded in the form of bellows.

In the folding way of the first embodiment, however, since the circumferential edge 19 on the vehicle front side is folded in the form of bellows so as to be easy to be unfolded, the circumferential edge 19 interferes with the wind shield W quickly when the air bag 11 is inflated. It is therefore easier to dispose the center vicinity 14b of the ceiling wall portion 14 vertically.

Figure 7:
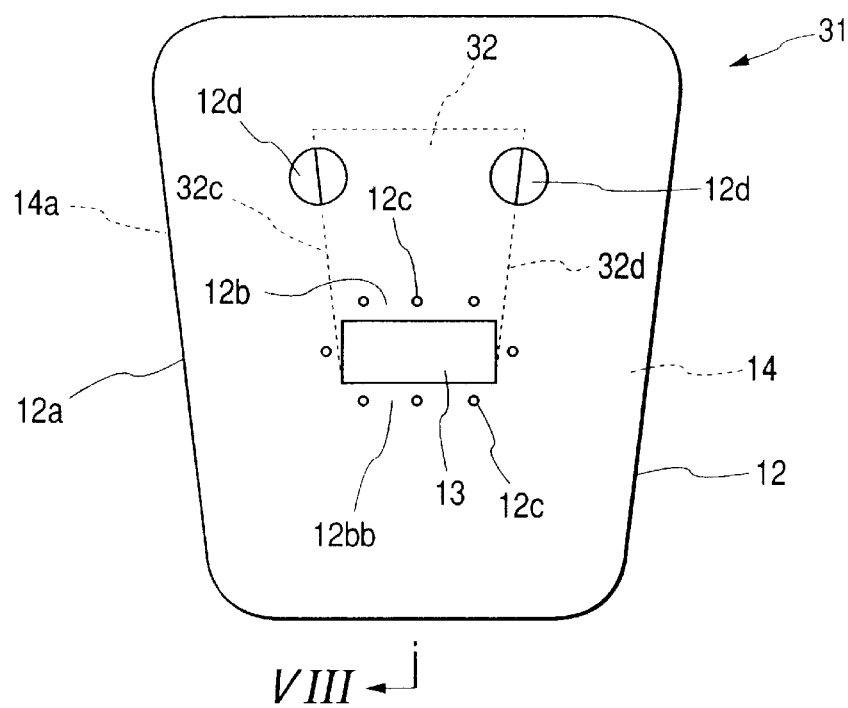
FIG. 7 shows a view in which an air bag of a second embodiment is viewed from the bottom wall portion thereof when the air bag is unfolded to be flat before being folded.
Figure 8:
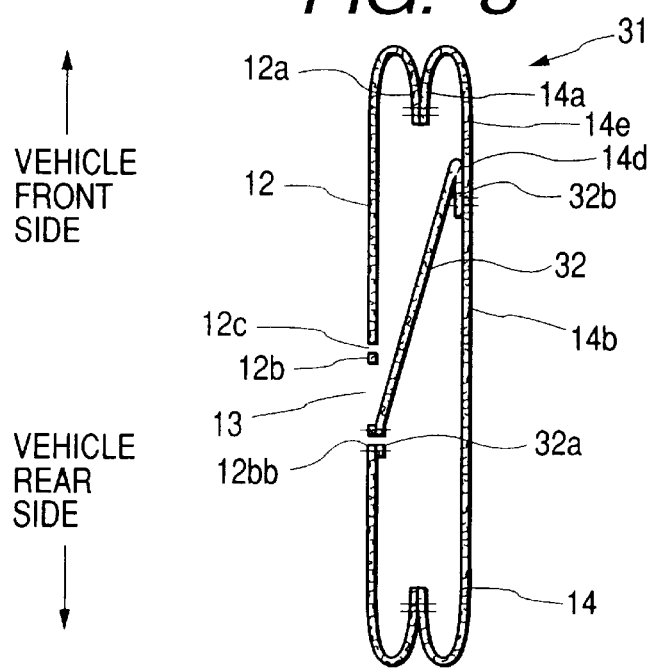
FIG. 8 shows an end view taken on line VIII—VIII of FIG. 7.
Figure 10:
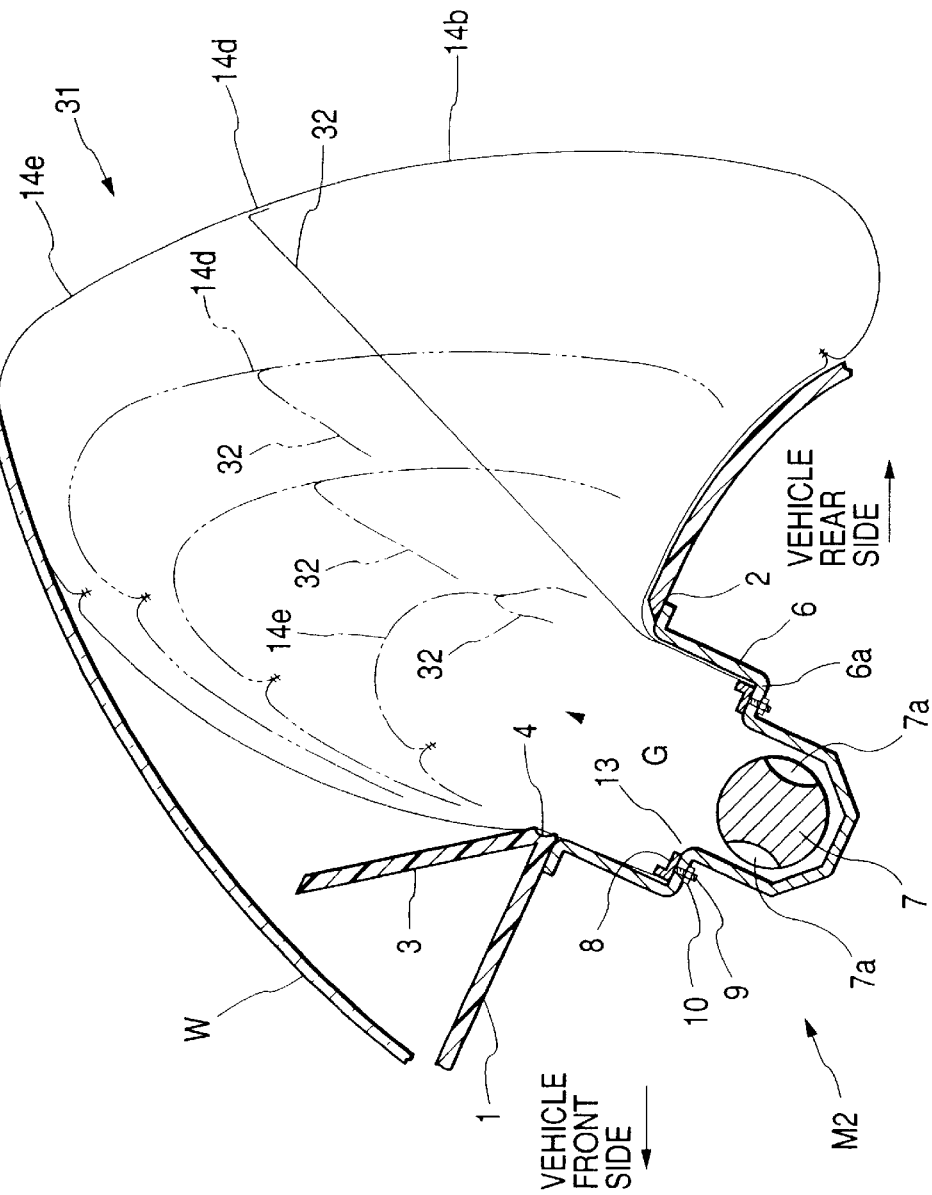
FIG. 10 shows a sectional view showing the same embodiment when the air bag is inflated.

A passenger seat air bag 31 of a second embodiment shown in FIGS. 7 and 8 is configured in the same manner as the air bag 11 of the first embodiment, except that the air bag 31 is used in a top mount type passenger seat air bag system M2 disposed on the top side of the instrument panel 1 as shown in FIG. 10; the air bag 31 is provided with a tether 32; and a process of folding is different. Accordingly, members or parts the same as those in the air bag 11 are referenced correspondingly, and the description thereof will be omitted.

The tether 32 provided in the air bag 31 of the second embodiment is formed to be long enough to generate tension when the air bag 31 is inflated to restrict the shape of the air bag 31 upon completion of the inflating. In addition, as shown in FIGS. 7 and 8, the tether 32 is disposed in the air bag 31 so that one end portion 32a of the tether 32 is sewed to be coupled with a rear edge 12bb on the vehicle rear side in an aperture-portion's circumferential edge 12b of a bottom wall portion 12 while the other end portion 32b is coupled with a position 14d on the vehicle front side of a center vicinity 14b of a ceiling wall portion 14. The tether 32 is formed like a band in which the width thereof increases from the end portion 32a to the end portion 32b. On the end portion 32a, the width of the tether 32 is set to be substantially equal to (a little larger than) the width of an aperture portion 13 which is open in the form of a rectangle. Thus, the tether 32 is formed to have a shape which can cover the aperture portion 13.

To manufacture the air bag 31, the bottom wall portion 12, the ceiling wall portion 14 and the tether 32 are prepared in advance. The end portion 32a of the tether 32 is sewed to be coupled with the rear edge 12bb of the aperture-portion's circumferential edge 12b while the respective portions of the bottom wall portion 12 and the ceiling wall portion 14 which will become the outer circumferences of the air bag 31 are brought into contact with each other. The bottom wall portion 12 and the ceiling wall portion 14 are put on top of each other. Outer circumferential edges 12a and 14a of the bottom wall portion 12 and the ceiling wall portion 14 are sewed with each other. Next, the air bag 31 sewed up is turned inside out by use of the aperture portion 13 so that a margin to sew up should not be exposed to the outer circumferential side. The end portion 32b of the tether 32 is sewed to be coupled with the predetermined position of the ceiling wall portion 14. In such a manner, the air bag 31 can be manufactured. Incidentally, the end portion 32a of the tether 32 may be coupled with the aperture-portion's circumferential edge 12bb of the bottom wall portion 12 after the end portion 32b is coupled with the ceiling wall portion 14 previously and the air bag 31 is turned inside out.

After the air bag 31 is manufactured, a retainer .8 is put into the air bag 31 by use of the aperture portion 13, and further respective bolts 9 are projected from through holes 12c. Next, the air bag 31 is folded.

Figure 9A:
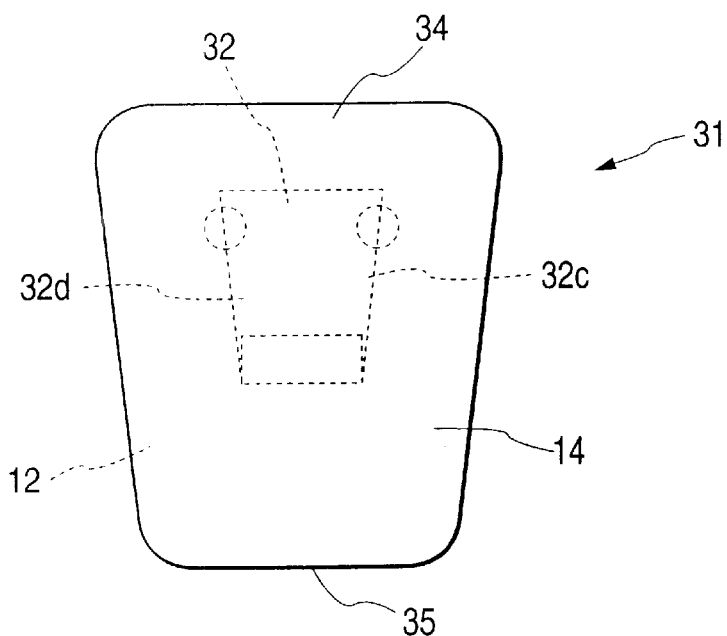
FIGS. 9A to 9C show views for explaining a process of folding in the same embodiment.
Figure 9B:
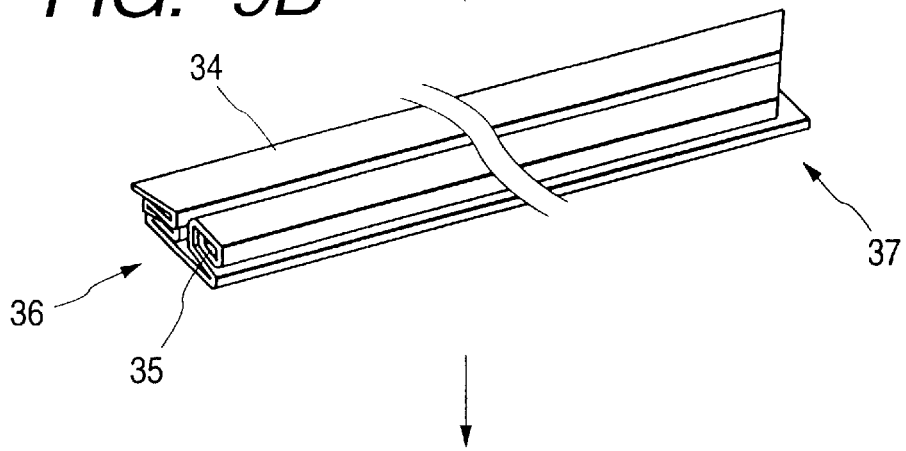

This folding may be attained in a usual folding process. For example, first, the bottom wall portion 12 and the ceiling wall portion 14 are put on top of each other so that the air bag 31 is unfolded to be flat, as shown in FIG. 9A. After that, a rear edge 34 on the front side of a vehicle is folded in the form of bellows so as to come close to the aperture portion 13 on the ceiling wall portion 14 as shown in FIG. 9B. At the same time, an edge 35 on the rear side of the vehicle is involution-rolled so as to be rolled so as to come close to the aperture portion 13 on the bottom wall portion 12 and put on the ceiling wall portion 14.

Figure 9C:
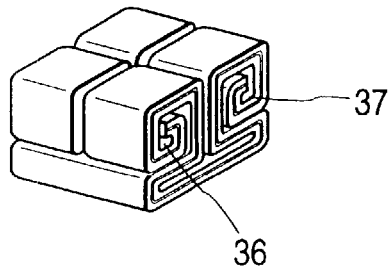

Then, as shown in FIG. 9C, left and right edges 36 and 37 are involution-rolled so as to be rolled so as to come close to the aperture portion 13 on the bottom wall portion 12, and put on the ceiling wall portion 14. In such a manner, the working of folding the air bag 31 can be completed.

Then, after the air bag 31 is folded, the respective bolts 9 are passed through holes 6b in a step portion 6a of a case 6 fixedly attached to an inflator 7, and fixed with nuts 10. Thus, the air bag 31 can be attached to the case 6. Furthermore, the case 6 is connected to a predetermined portion of the vehicle by use of a not-shown bracket extending from the case 6. Thus, the air bag system M2 can be disposed under the instrument panel 1 and mounted on the vehicle.

If inflating gas G is discharged from a gas outlet 7a of the inflator 7 after the air bag system M2 is mounted on the vehicle, the air bag 31 allows the inflating gas G to flow in through the aperture portion 13. As a result, the air bag 31 inflates and pushes the door 3 open. The air bag 31 projects from an aperture 2 of the instrument panel 1, interferes with a wind shield W, and projects backward on a large scale, as shown in FIG. 10.

At that time, in the air bag 31 of the second embodiment, when the inflating gas G flows into the air bag 31 through the aperture portion 13, the inflating gas G is guided by the tether 32 so as to flow toward the vehicle front side from the center vicinity 14b of the ceiling wall portion 14. As a result, a portion 14e (see FIG. 8) where the inflating gas G flows is projected as shown by the one-dot chain line in FIG. 10.

However, the projecting portion 14e is regulated by the tether 32 so as not to project over the length of the let out tether 32. Thus, the initial projecting quantity at the beginning of inflating is restrained.

Moreover, the center vicinity 14b of the ceiling wall portion 14 which is apt to inflate also starts to project due to the inflating gas G flowing between each of the left and right edges 32c and 32d of the tether 32 (see FIGS. 7 and 9A) and the inner circumferential surface of the bottom wall portion 12 or the ceiling wall portion 14. As a result, the center vicinity 14b projects backward over a wide area together with the portion 14e projecting initially at the beginning of the inflating.

Further, the tether 32 is disposed to be connected between the rear edge 12bb on the vehicle rear side of the aperture-portion's circumferential edge 12b in the bottom wall portion 12 and the portion 14d on the vehicle front side of the center vicinity 14b in the ceiling wall portion 14, so as to be coupled therewith and cover the vehicle rear side of the aperture portion 13. Accordingly, if the inflating gas G interferes with the tether 32, such a moment that the ceiling wall portion 14 is rotated backward is made to act on the air bag 31 by the tether 32. Therefore, the portion 14e projecting initially at the beginning of the inflating and the ceiling wall portion center vicinity 14b become substantially parallel with a vertical plane as shown by the two-dot chain line and the three-dot chain line in FIG. 10.

As a result, also in the passenger seat air bag 31 of the second embodiment, even if it is an planar air bag in which the aperture portion 13 for inflating gas inlet is disposed substantially at the center of the bottom wall portion 12, the air bag 31 is restrained from projecting partially at the beginning of inflating. It is therefore possible to bind a passenger with a wide vertical plane even if the passenger is bound in the middle of the inflating, so that it is possible to reduce the pressure to be given to the passenger.

Incidentally, in the air bag 31 of the second embodiment, the folding way is not limited to that in the embodiment. That is, in the state where the ceiling wall portion 14 is put on the bottom wall portion 12 so that the air bag 31 is unfolded to be flat, the opposite edges in the front/rear direction of the vehicle may be suitably revolution-rolled, involution-rolled, and folded in the form of bellows, and next the opposite sides in the left/right direction may be suitably revolution-rolled, involution-rolled, and folded in the form of bellows. Alternatively, in the state where the ceiling wall portion 14 is put on the bottom wall portion 12 so that the air bag 31 is unfolded to be flat, the opposite sides in the left/right direction may be suitably revolution-rolled, involution-rolled, and folded in the form of bellows, and next the opposite edges on the vehicle front side and on the vehicle rear side may be suitably revolution-rolled, involution-rolled, and folded in the form of bellows.

Not to say, in the same manner as in the first embodiment, a coupling portion 16 on the vehicle front side may be shifted toward the vehicle rear side at the beginning of folding, and then the air bag 31 may be folded.

Figure 11:
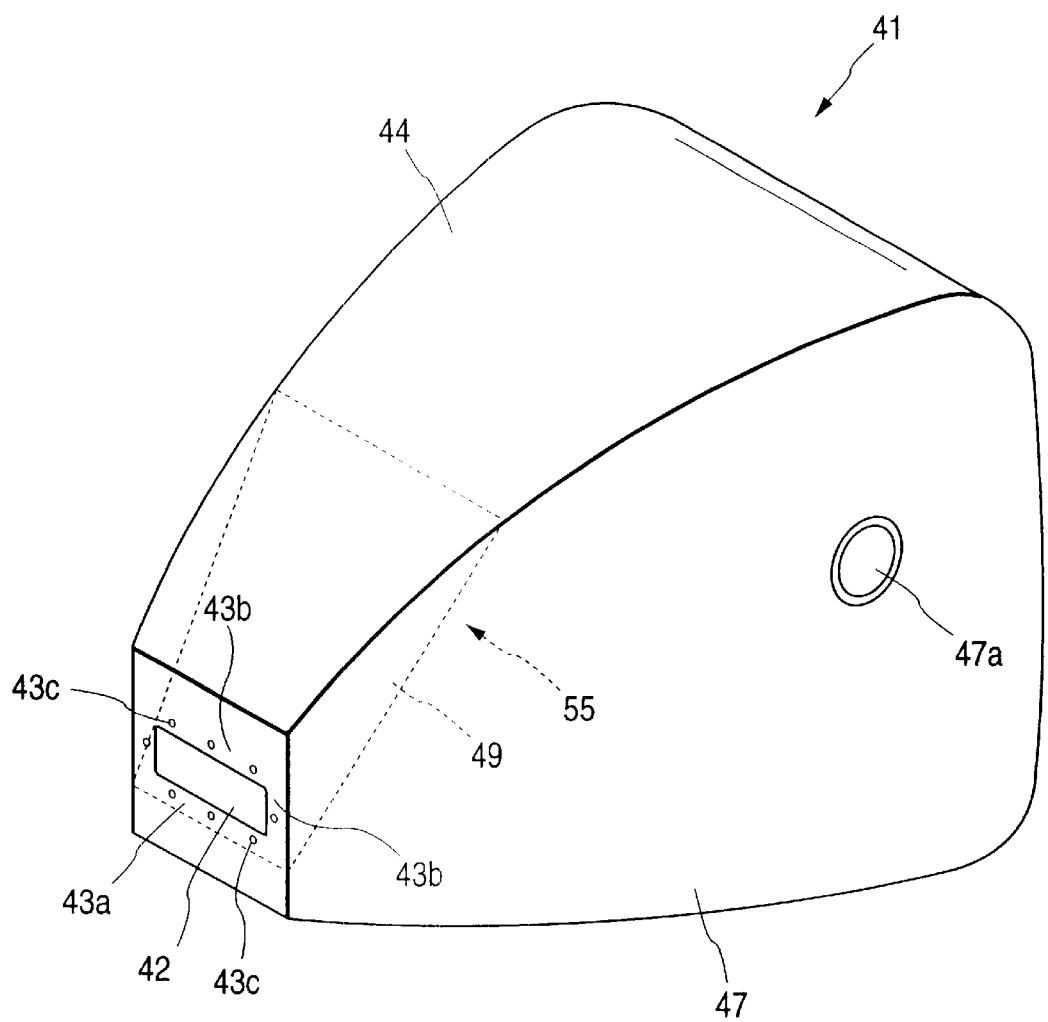
FIG. 11 shows a perspective view showing a cubic air bag in a third embodiment according to the present invention.
Figure 12:
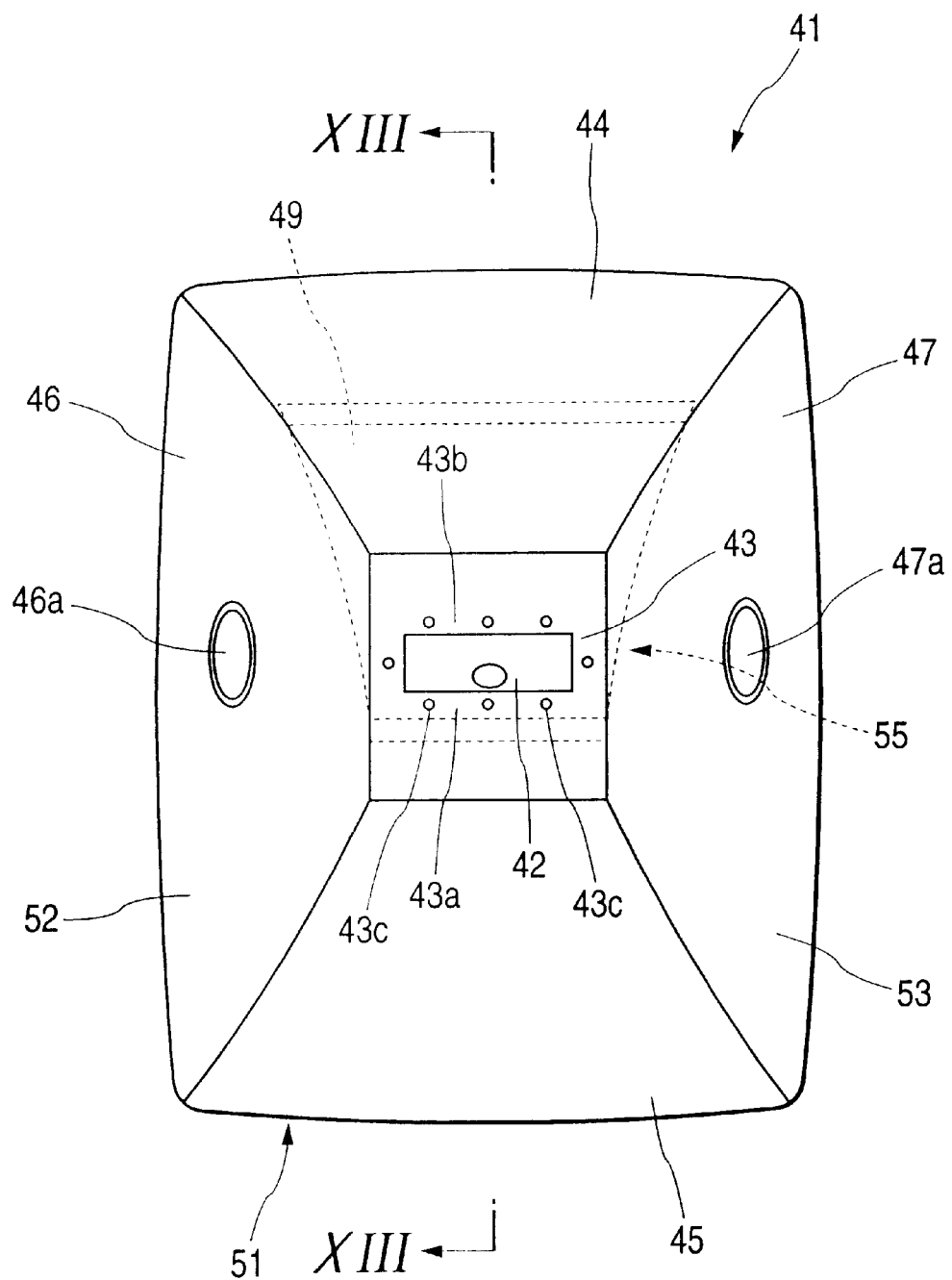
FIG. 12 shows a view in which the air bag shown in FIG. 11 is viewed from the aperture portion.
Figure 13:
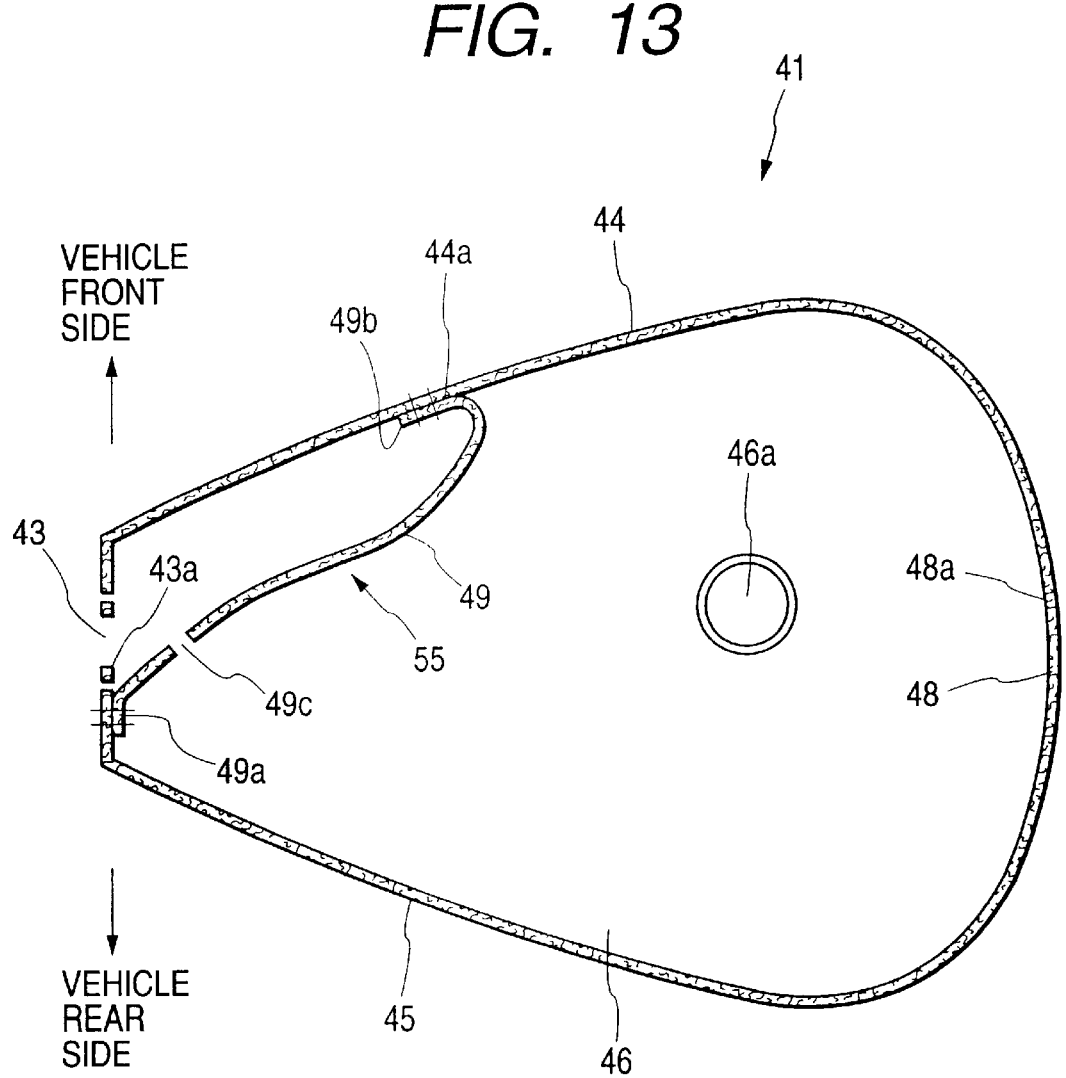
FIG. 13 shows schematic sectional view taken on line XIII—XIII of FIG. 12.

In the case of not such a planar air bag as shown in the first or second embodiment but a cubic air bag such as a passenger seat air bag 41 shaped into a substantially quadrangular prism according to a third embodiment as shown in FIGS. 11 to 13, it may be arranged so that a passenger can be bound with a wide area even if the passenger is bound in the middle of inflating, as follows.

That is, a sub-bag 55 for allowing inflating gas G to flow in and inflate the sub-bag 55 is disposed inside the air bag 41 so as to cover an aperture portion 42 for inflating gas inlet. The inflating gas G is made to flow toward the lower portion side of the air bag 41 through a vent hole 49c provided on the lower portion side of the sub-bag 55. At the same time, the inflating gas G is also made to flow from the left and right sides of the sub-bag 55. Thus, the air bag 41 is inflated so that a ceiling wall portion 48 on the passenger side of the air bag 41 is unfolded with a wide area disposed substantially vertically, and moved backward.

More specifically, the air bag 41 is used in a top mount type passenger seat air bag system M3 which is disposed on the top side of an instrument panel 1, as shown in FIG. 14. Incidentally, the instrument panel 1, a case 6, an inflator 7, a retainer 8, bolts 9 and nuts 10 are similar to those in the air bag systems M1 and M2 in the first and second embodiments They are referenced correspondingly, and their description will be omitted.

In addition, the air bag 41 has a closed-end shape like a substantially quadrilateral cylinder with an upper wall portion 44, a lower wall portion 45, left and right side wall portions 46 and 47, and a passenger-side ceiling wall portion 48, when the air bag 41 has inflated. Vent holes 46a and 47a for discharging surplus inflating gas are formed in the side wall portions 46 and 47. In addition, in this embodiment, the air bag 41 is constituted by three panels in all, that is, a main panel 51 forming the upper wall portion 44, the ceiling wall portion 48 and the lower wall portion 45, and two side panels forming the respective side wall portions 46 and 47. The air bag 41 is manufactured by coupling the circumferential edges of the side panels 52 and 53 with the left and right edges of the main panel 51 by sewing or the like. A circumferential edge 43 of the aperture portion 42 for inflating gas inlet is formed by extending the main panel 51 or the side panels 52 and 53 partially suitably and, if necessary, putting and sewing them on top of each other. Incidentally, the respective panels 51 to 53 are composed of fabric using polyester yarn, polyamide yarn or the like, and, if desired, a heat-resistant coating layer of silicon or the like is provided in the portion which will become the inner circumference of the air bag 41. In addition, through holes 43c for inserting the respective bolts 9 of the retainer 8 are formed in the aperture-portion's circumferential edge 43.

The sub-bag 55 is formed by sewing a trapezoidal sheet-like flow control tether 49 with the inner circumferential surface of the air bag 41. That is, one end portion 49a of the flow control tether 49 is coupled with the rear end 43a of the aperture-portion's circumferential edge 43 by sewing or the like, while the other end portion 49b is coupled with an intermediate vicinity 49b in the front/rear direction of the upper wall portion 44 on the front end 43b of the aperture-portion's circumferential edge 43 by sewing or the like. The sub-bag 55 is formed thus. The width of the end portion 49a of the tether 49 is set to be substantially equal to (a little larger than) the width of the aperture portion 42 which is open in the form of a rectangle. The width of the end portion 49b is set to be substantially equal to the width of a portion 44a of the upper wall portion 44 where the end portion 49b is coupled. In such a manner, the tether 49 can cover the aperture portion 42.

In the flow control tether 49, one or more vent holes 49c are provided in positions on the lower portion of the sub-bag 55 when the sub-bag 55 is inflated. The vent holes 49c are disposed in such positions that they can make the inflating gas G, which flows into the air bag 41 from the aperture portion 42, flow to the downstream-side in the direction substantially perpendicular to the direction of inflow of the gas when the sub-bag 55 is inflated.

Also in this air bag 41, the retainer 8 is put into the air bag 41 in advance so that the respective bolts 9 are projected from the through holes 43c, before the air bag 41 is folded. Then, the air bag 41 may be folded in such a manner that the air bag 41 is unfolded to be flat so that the circumferential edge of a center vicinity 48a of the center wall portion 48 of the air bag 41 comes close to the aperture portion 42, and the air bag 41 is folded so that the circumferential edges come close to the aperture portion 42 in a desired folding way such as inward roll-folding, outward roll-folding, folding in the form of bellows, etc.

Then, after the air bag 41 is folded, the respective bolts 9 are passed through holes 6b in a step portion 6a of the case 6 fixedly attached to the inflator 7, and fixed with the nuts 10. Thus, the air bag 41 can be attached to the case 6. Furthermore, the case 6 is connected to a predetermined portion of the vehicle by use of a not-shown bracket extending from the case 6. Thus, the air bag system M3 can be disposed under the instrument panel 1 and mounted on the vehicle.

If inflating gas G is discharged from a gas outlet 7a of the inflator 7 after the air bag system M3 is mounted on the vehicle, the air bag 41 allows the inflating gas G to flow in through the aperture portion 42. As a result, the air bag 41 inflates and pushes the door 3 open. The air bag 41 projects from an aperture 2 of the instrument panel 1, interferes with a wind shield W, and projects backward on a large scale.

Figure 15A:
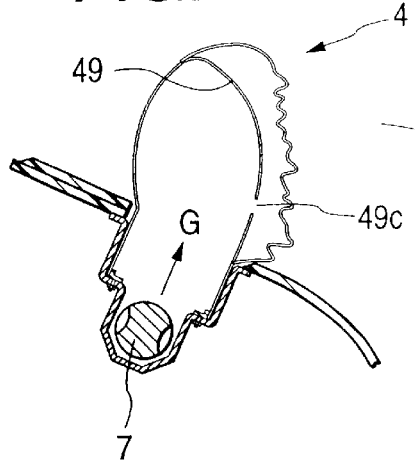
FIG. 15 shows an explanatory view showing the cubic air bag shown in FIG. 11 when it is inflated.
Figure 15B:
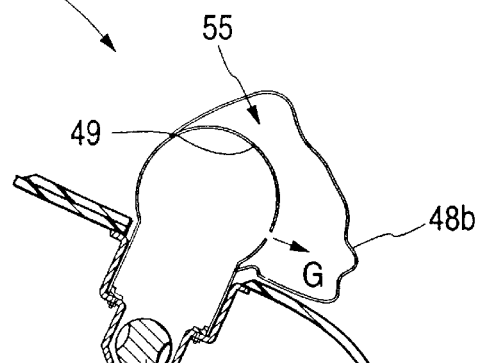
Figure 15C:
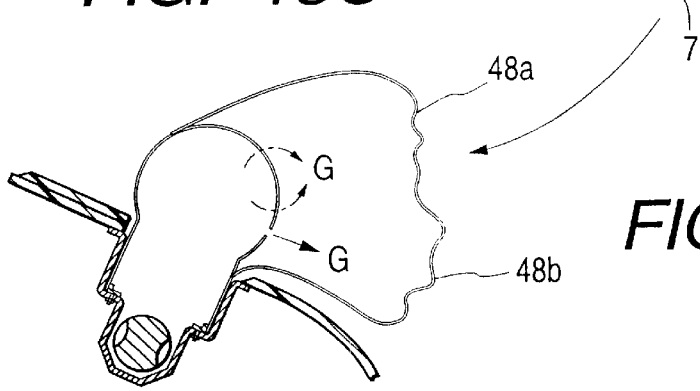
Figure 15D:
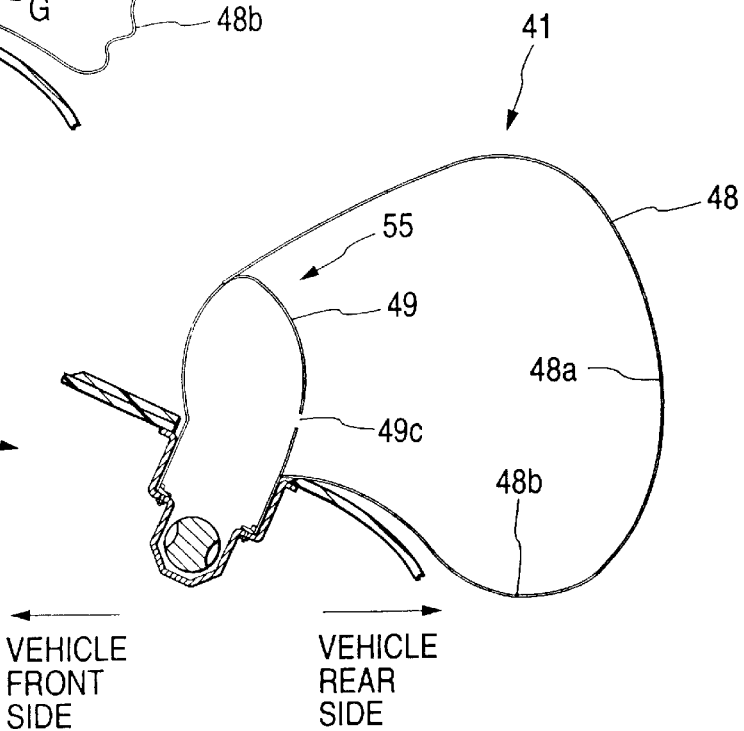

At that time, in this air bag 41, first at the beginning of inflating, the sub-bag 55 inflates and the inflating gas G flows out toward the lower portion of the air bag 41 through a vent hole 49c provided on the lower portion of the sub-bag 55, as shown in FIGS. 15A and 15B. In addition, the inflating gas G flows out through gaps between the left and right sides of sub-bag 55 and the left and right side wall portions 46 and 47.

As a result, the inflating gas G reserved in the sub-bag 55 flows toward the lower portion of the air bag 41 through the vent hole 49 so that the lower portion 48b of the ceiling wall portion 48 projects. In addition, the inflating gas G reserved in the sub-bag 55 leaks from the left and right sides of the sub-bag 55 and flows into the air bag 41 so that the center vicinity 48a of the ceiling wall portion 48 which is easy to project projects gradually. Thus, the passenger-side ceiling wall portion 48 of the air bag 41 is unfolded with a wide area and moved backward. Thus, it is possible to bind a passenger with a wide area (the ceiling wall portion 48) even if the passenger is bound in the middle of inflating. It is therefore possible to reduce the pressure to be given to the passenger.

Incidentally, in this air bag 41, if the capacity of the inflating gas G passed through the vent hole 49c of the tether 49 in such a manner that the inner diameter of the vent hole 49c is enlarged or the number of vent holes 49c is increased, the ceiling wall portion lower portion 48b can be disposed quickly on the leg portion side of the passenger.

Figure 20:
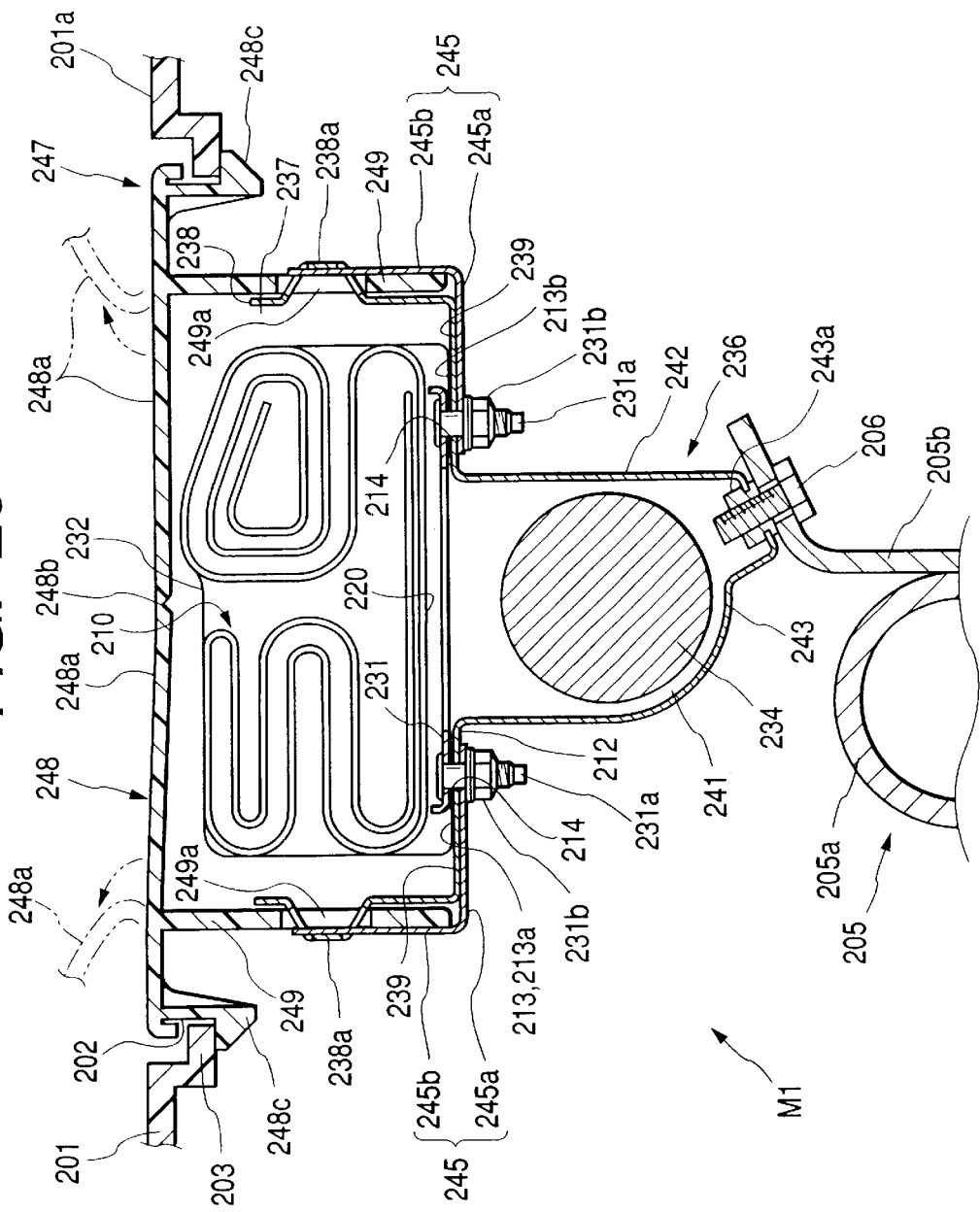
FIG. 20 shows a sectional view showing a use state of a passenger seat air bag system using the air bag in the same embodiment.
Figure 21:
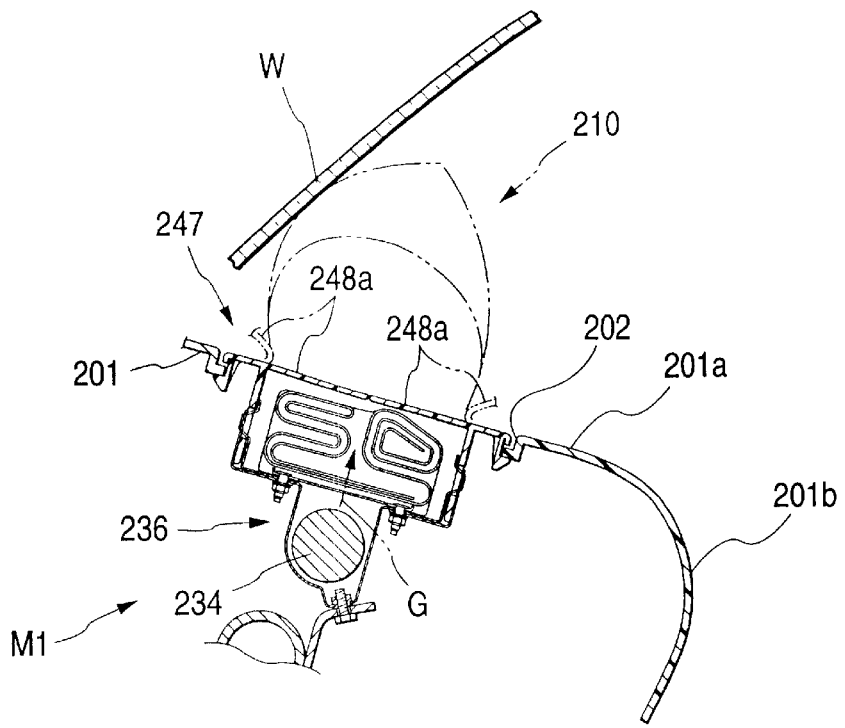
FIG. 21 shows a view for explaining a state where the air bag in the same embodiment is inflated.

An air bag 210 according to a forth embodiment of the present invention is used in a top mount type passenger seat air bag system M1 which is disposed on a top surface 1a of an instrument panel 201, as shown in FIGS. 20 and 21. As shown in FIG. 20, the air bag system M1 is constituted by the folded air bag 210, an inflator 234 for supplying inflating gas to the air bag 210, a case 236 for receiving and holding the air bag 210 and the inflator 234, a retainer 231 for attaching the air bag 210 to the case 236, an air bag cover 247 for covering the folded air bag 210, and two pressing plates 245 for connecting the air bag cover 247 with the case 236 firmly.

The retainer 231 for attaching the air bag 210 to the case 236 is made of a metal plate and shaped into a square annulus. The retainer 231 has at its predetermined positions a plurality of bolts 231a extending downward. The respective bolts 231a are inserted into attachment holes 214 of the air bag 210 which will be described later, and a bottom wall portion 239 of the case 236 or horizontal plate portions 245a of the pressing plates 245 which will be described later. The respective bolts 231a are then fixed with nuts 231b. Thus, the retainer 231 is attached to the case 236.

The inflator 234 is formed as a cylinder type, and received and retained in a lower portion chamber 241 of the case 236 which will be described later.

The air bag cover 247 is made of polyolefin or polyester thermoplastic elastomer, or the like, and constituted by a ceiling wall portion 248 and side wall portions 249. The ceiling wall portion 248 is disposed so as to close an aperture 202 of the instrument panel 201 which is open in the form of a rectangle. The side wall portions 249 define a substantially square cylindrical shape and extend downward from the lower surface of the ceiling wall portion 248. A pair of doors 248a and 248a are provided in an inside portion surrounded by the side wall portions 249 in the ceiling wall portion 248. The doors 248a and 248a are surrounded by a thin rupture presumptive portion 248b. Viewed from above the ceiling wall portion 248, the rupture presumptive portion 248b is formed substantially into an H-shape. When the rupture presumptive portion 248b is pushed and broken by the air bag 210 which is inflating, the doors 248a and 248a are opened like a casement in the front/rear direction of the vehicle as shown by the two-dot chain lines in FIGS. 20 and 21. In addition, a plurality of lock feet 248c projecting downward are formed at the circumferential edge of the aperture 202 of the instrument panel 201 in the front/rear direction of the vehicle. The respective lock feet 248c are locked on the lower surface of a flange portion 203 which is provided-with:a step at the circumferential edge of the aperture 202 of the instrument panel 201. In portions of the side wall portions 249 in the front/rear direction of the vehicle, a plurality of lock holes 249a are formed so as to penetrate the side wall portions 249 in the front/rear direction of the vehicle. By use of these lock holes 249a and the pressing plates 245, the side wall portions 249 are connected to an upper portion chamber 237 of the case 236 which will be described later.

Each of the pressing plates 245 is formed of a metal plate so as to have a sectional L-shape with a horizontal plate portion 245a and a vertical plate portion 245b which extends upward from the horizontal plate portion 245a. The pressing plates 245 are disposed in portions of the case 236 in the front/rear direction of the vehicle respectively. Through holes (having no reference numeral) for inserting the respective bolts 231a of the retainer 231 are formed in the respective horizontal plate portions 245a. The upper ends of the respective vertical plate portion 245b are formed to be able to be inserted into lock protrusions 238a of the case 236 which will be described later.

The case 236 is formed of a metal plate and constituted by the upper portion chamber 237 and the lower portion chamber 241. The upper portion chamber 237 is shaped into a rectangular parallelepiped which is open on top. The lower portion chamber 241 is disposed on the lower portion side of the case 236 so as to communicate with the upper portion chamber 237.

The upper portion chamber 237 is constituted by a substantially square cylindrical circumferential wall portion 38 and the bottom wall portion 239 which is disposed under the circumferential wall portion 238. The lock protrusions 238a to be inserted into the respective lock holes 249a of the side wall portions 249 of the air bag cover 247 are formed on the circumferential wall portion 238 so as to project outward. Through holes (having no reference numeral) for inserting the respective bolts 231a of the retainer 231 are formed in the bottom wall portion 239. On the lower surfaces of portions of the bottom wall portion 239 in the front/rear direction of the vehicle, the horizontal plate portions 245a of the pressing plates 245 are disposed in contact therewith respectively.

The lower portion chamber 241 is constituted by a substantially square cylindrical circumferential wall portion 242 which extends downward from the inner end portion of the bottom wall portion 239 and a bottom wall portion 243 which closes the lower end of the circumferential wall portion 242. A nut 243a for attaching the case 236 to a body 205 is attached to the bottom wall portion 243. The bottom wall portion 243 is attached to a bracket 205b which extends from a reinforcement 205a of the body 205. The attachment of the bottom wall portion 243 to the bracket 205b is performed by screwing a bolt 206 down to the nut 243a through a connecting hole (having no reference numeral) provided in the bracket 205b.

Figure 16:
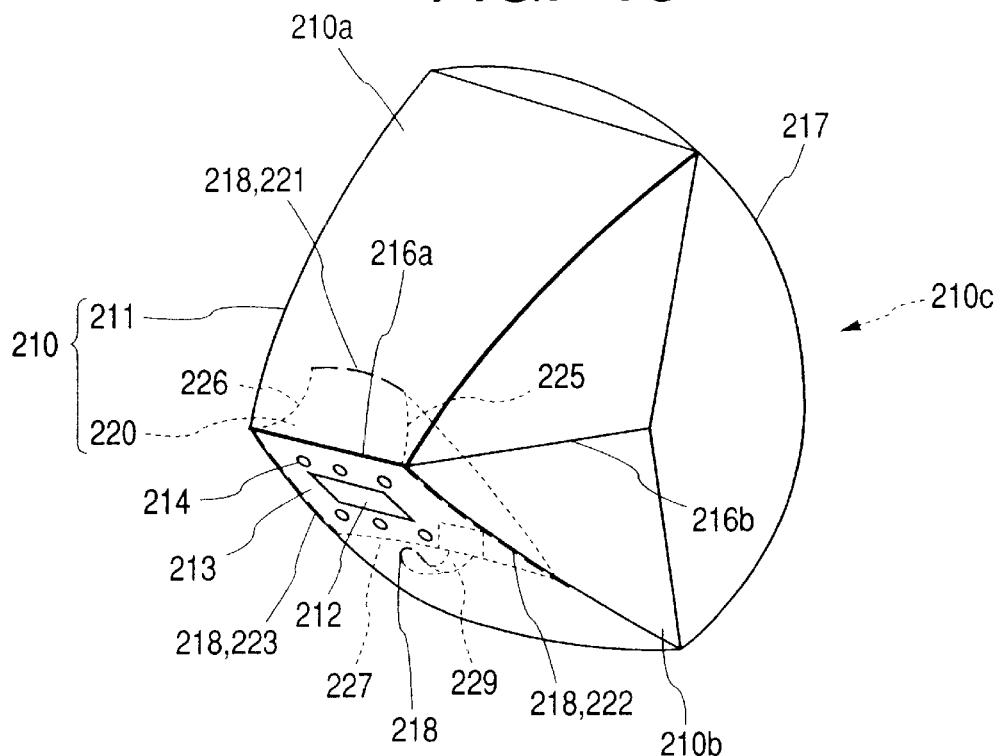
FIG. 16 shows perspective view showing a state where an air bag according to a fourth embodiment of the present invention is inflated independently.
Figure 17:
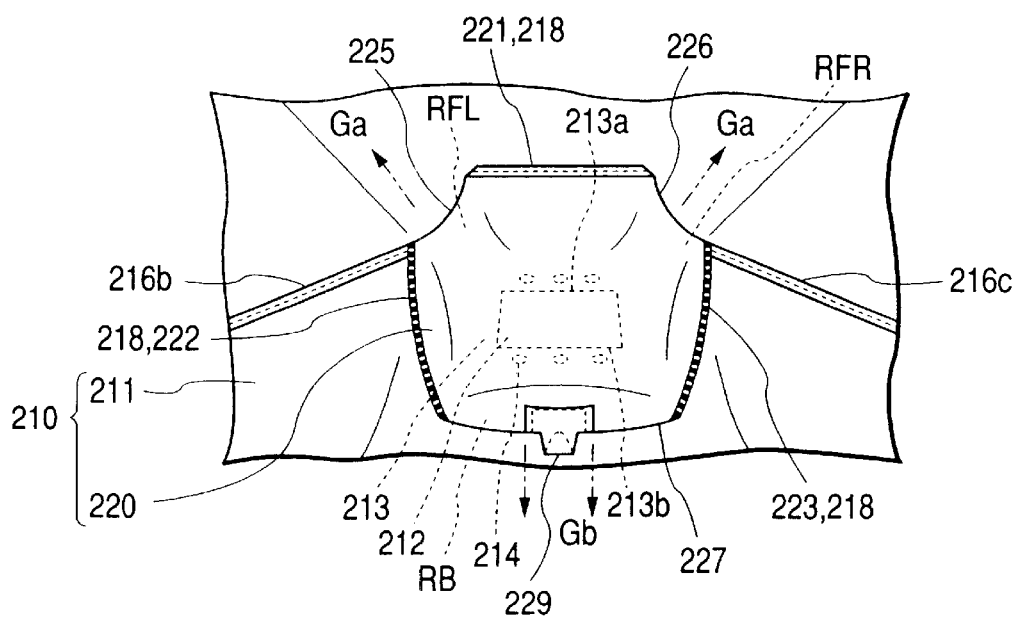
FIG. 17 shows a view in which the gas inlet side of the air bag in the same embodiment is viewed from the inside of the air bag in the state where the air bag is inflated independently.
Figure 18:
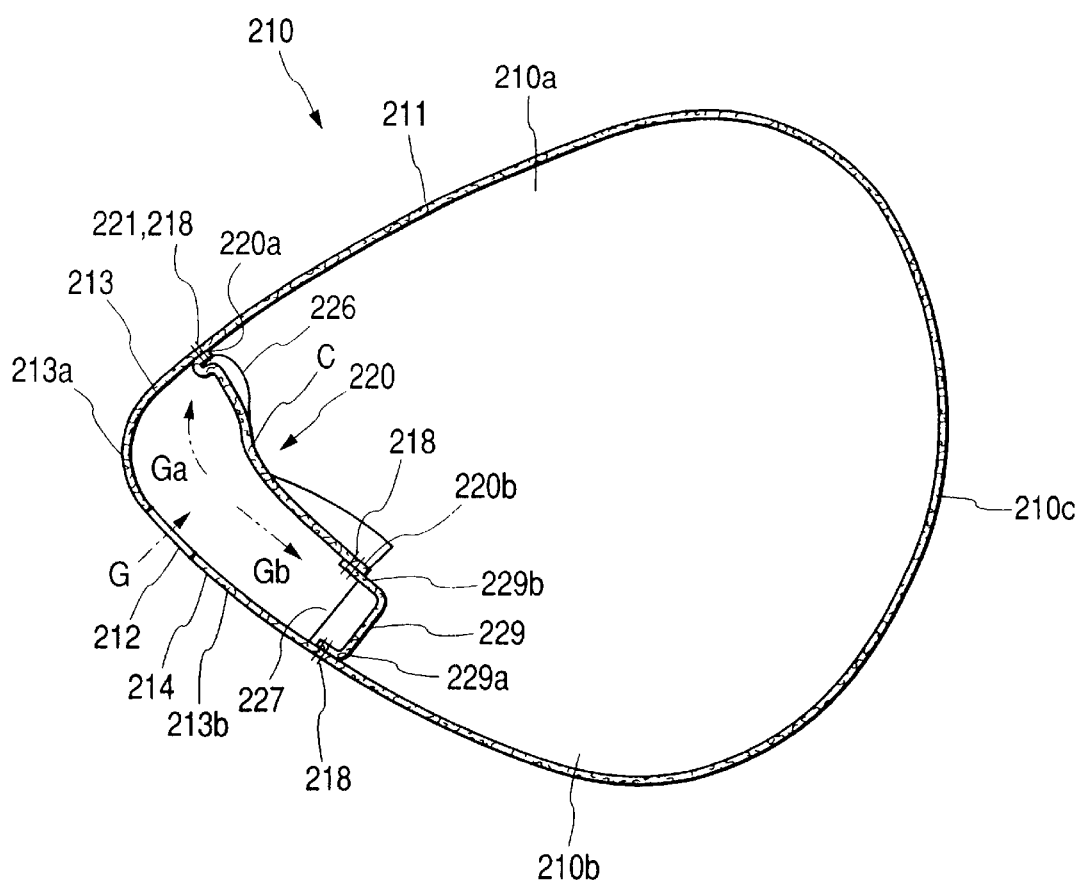
FIG. 18 shows a longitudinally sectional view in the front/rear direction showing a state where the air bag in the same embodiment is inflated independently.

As shown in FIGS. 16 to 18, the air bag 210 is constituted by the air bag 211, a flow control cloth 220 and a connecting belt 229. The air bag body 211 has a bag-like shape like a substantially truncated prismoid when it is unfolded and inflated. The flow control cloth 220 serves to change the flow of inflating gas G flowing into the air bag 210. The connecting belt 229 serves to prevent the position of the flow control cloth 220 from being shifted.

A gas inlet 212 for allowing the inflating gas G to flow into the air bag 211 is disposed in the lower portion of the air bag body 211 which will become the front side of the vehicle. The gas inlet 212 is open in the form of a rectangle. A plurality of attachment holes 214 penetrate the circumferential edge of the gas inlet 212. The respective bolts 231a of the retainer 231 are inserted into the attachment holes 214 so that the air bag body 211 is retained on the bottom wall portion 239 of the case 236. A not-shown reinforcing cloth is provided separately near the attachment holes 214 at the circumferential edge of the gas inlet 212 in the inner circumferential surface of the air bag body 211.

Thus, the air bag 210 is retained on the case bottom wall portion 239 by the retainer 231, and the case 236 is attached to the body 205. When the air bag system M1 is then mounted on the vehicle, the aperture plane of the gas inlet 212 is disposed along such a substantially horizontal plane that a front edge 213a of an aperture circumferential edge 213 becomes a little higher than a rear edge 213b thereof.

Figure 19A:
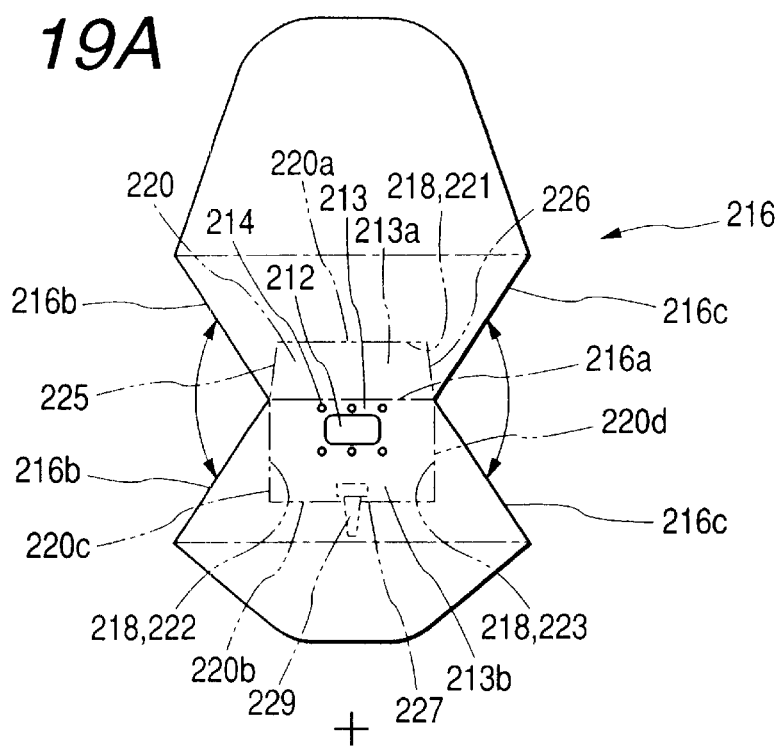
FIGS. 19A to 19C show views for explaining a process of sewing up an air bag body in the air bag in the same embodiment.
Figure 19B:
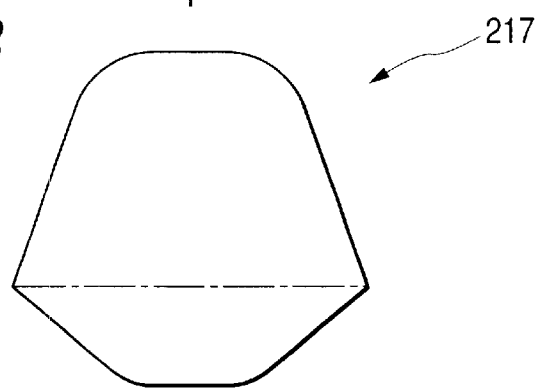
Figure 19C:
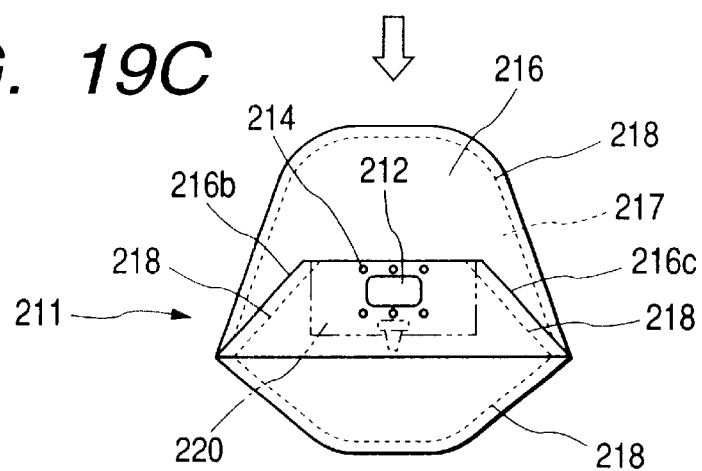

Further, the air bag body 211 is, as shown in FIG. 19, manufactured by sewing first and second base cloths 216 and 217 woven out of polyester yarn, polyamide yarn, or the like. The first base cloth 216 is formed into a gourd shape in which the left and right edges are dented near the center. The second base cloth 217 is formed into a substantially equilateral hexagon. These base cloths 216 and 217 are established so that the air bag body 211 can be formed to be cubic by planar sewing.

Description will be made about this sewing of the air bag body 211. First, at the left and right edges of the first base cloth 216 near the gas inlet 212, the first base cloth 216 is folded back with respect to a reference line 216a which extends in the left/right direction on the front edge 213a side of the aperture circumferential edge 213. By use of sewing yarn 218, edge portions 216b and 216b on one edge side are sewn up with each other while edge portions 216c and 216c on the other edge side are sewn up with each other. By this sewing, the circumferential edge of the first base cloth 216 terminated away from the gas inlet 212 in the state where the first base cloth 216 is unfolded to be flat is formed into the same shape as that of the outer circumferential edge of the second base cloth 217 in the state where the second base cloth 217 is unfolded to be flat. Thus, after the portions 216b and 216c of the first base cloth 216 are sewn up with each other, the circumferential edge of the first base cloth 216 terminated away from the gas inlet 212 is put on top of the second base cloth 217 which is unfolded to be flat. If those outer circumferential edges put on top of each other are sewn up by use of the sewing yarn 218, the air bag body 211 can be formed into a bag.

Practically, after the air bag body 211 is formed into a bag, the air bag body 211 is turned inside out by use of the gas inlet 212 so that margins to sew up the respective portions 216b and 216c should not be exposed to the outer circumferential surface side of the air bag 210.

In addition, before the air bag body 211 is formed into a bag, the flow control cloth 220 and the connecting belt 229 (and further a not-shown reinforcing cloth) are coupled with the first base cloth 216 around the gas inlet 212 located on the inner circumferential surface of the air bag 210, as will described later.

As shown in FIGS. 16 to 19, the flow control cloth 220 is woven out of polyester yarn, polyamide yarn, or the like, and formed into a substantially rectangular shape larger in size in the front/rear and left/right directions than the gas inlet 212 so that the flow control cloth 220 can cover the gas inlet 212. The flow control cloth 220 is disposed so that when the air bag 210 is unfolded and inflated, the flow rate of inflating gas Ga flowing toward the front side of a substantially middle portion C in the front/rear direction which is opposite to the vicinity of the center of the gas inlet 12 is made higher than the flow rate of inflating gas Gb flowing toward the rear side thereof.

In this embodiment, as shown by the two-dot chain line in FIG. 19A, a rear edge 220b of the flow control cloth 220 is not coupled with the first base cloth 216 of the air bag body 211 while left and right edges 220c and 220d and a front edge 220a are coupled with the circumferential edge portion 213 of the gas inlet 212 in the inner circumferential surface of the first base cloth 216 of the air bag body 211 by use of the sewing yarn 218. Then, the flow control cloth 220 is disposed so that the center in the left/right direction thereof coincides with the center in the left/right direction of the gas inlet 212, and the front edge 220a is passed through the gas inlet 212 and coupled with the front side of the first base cloth 216 across the reference line 216a, while the left and right edges 220c and 220d are not sewn with the first base cloth 16 near the front edge 220a.

Thus, in the air bag 210 according to-the embodiment, gas communication holes 225 to 227 which allow the inflating gases Ga and Gb to pass therethrough are disposed between the left and right edges 220c and 220d of the flow control cloth 220 near the front-edge 220a and the first base cloth 216 of the air bag body 211 and between the rear edge 220b of the flow control cloth 220 and the first base cloth 216 of the air bag body 211, respectively.

As for the flow rates of the inflating gases Ga and Gb passing through the respective gas communication holes 225 to 227 when the air bag 210 is unfolded and inflated, the aperture areas of the respective gas communication holes 225 to 227 are set so that the flow rate passing through the gas communication hole 227 becomes higher than the total amount of the flow rates passing through the gas communication holes 225 and 226. Further, in this embodiment, the left and right gas communication holes 225 and 226 have substantially the same aperture area so as to have the same flow rate of the inflating gas Ga passing therethrough.

In addition, the connecting belt 229 is disposed between the vicinity of the center of the rear edge 220b of the flow control cloth 220 and the rear edge 213b of the aperture circumferential edge 213 in the first base cloth 216 of the air bag body 211 so as to connect the respective rear edges with each other. The connecting belt 229 is woven out of polyester yarn, polyamide yarn, or the like, and formed into a belt with flexibility. Opposite end portions 229a and 229b of the connecting belt 229 are connected to the rear edge 220b and the rear edge 213b by use of the sewing yarn 218, respectively. This connecting belt 229 restricts the forward movement of the flow control cloth 220 from the area of the gas inlet 212 in a direction perpendicular to the aperture plane of the gas inlet 212 when the inflating gas G flows in through the gas inlet 212. The length and width of the connecting belt 229 are set within a range in which the flow rate of the inflating gas Gb passing through the gas communication hole 227 is not lowered. In addition, an end portion 229a of the connecting belt 229 to be coupled with the rear edge 213b of the aperture circumferential edge 213 is positioned so as to be disposed on the case bottom wall portion 239 when the air bag 210 is mounted on the vehicle.

Further, the connecting belt 229 may be formed integrally with the flow control cloth 220 so as to extend from the rear edge 220b.

Description will be made about the manufacturing of the air bag 210 according to the embodiment. First, a not-shown reinforcing cloth and the flow control cloth 220 are coupled with the aperture circumferential edge 213 of the gas inlet 212 in the first base cloth 16 which will become the inner circumferential surface of the air bag 210. In addition, the flow control cloth 220, the first base cloth 216 and the connecting belt 229 are coupled with one another. Next, the edge portions 216b and 216b of the first base cloth 216 are coupled with each other while the edge portions 216c and 216c are coupled with each other. The circumferential edge of the end portion terminated away from the gas inlet 212 is coupled with the outer circumferential edge of the second base cloth 217. The air bag body 211 is turned inside out by use of the gas inlet 212. Thus, the air bag 210 can be manufactured.

Incidentally, in the case where the air bag body 211 is difficult to be turned inside out by use of the gas inlet 212, the air bag 210 may be manufactured as follows. The flow control cloth 220 or the connecting belt 229 is designed to be divided in a portion which is distant from the portion where the flow control cloth 220 or the connecting belt 229 will be coupled with the base cloth 216, and such divided bodies are coupled with the base cloth 216 in advance. After the air bag body 211 is formed, the air bag body 211 is turned inside out by use of the gas inlet 212. After that, predetermined end portion of the divided bodies are extracted from the gas inlet and coupled with each other.

Description will be made about how to mount the air bag 210, which is manufactured as described above, on the vehicle. First, the air bag 210 is folded in the state where the retainer 231 is disposed inside the air bag 210 so as to make the bolts 231a project from the attachment holes 214 respectively. Further, the folded air bag 210 is wrapped with a rupturable wrapping sheet 232 (see FIG. 20) in advance so as not to get out of folding. Incidentally, the air bag 210 is elongated on the rear portion side of the gas inlet 212 in advance so that the lower portion 210b side of the air bag 210 easily deploys along the rear surface 201b of the instrument panel 201 from the top surface 201a thereof when the air bag 210 is unfolded and inflated. When the air bag 210 is folded, the elongated portion is revolution-rolled on its lower surface side (see FIG. 20).

Then, the inflator 234 is received in the lower portion chamber 241 of the case 236. In addition, the folded air bag 210 is received in the upper portion chamber 237 so that the respective bolts 231a of the retainer 231 project from the respective bottom wall portions 239 of the case 236. Further, the upper portion chamber 237 is armored with the side wall portions 249 of the air bag cover 247 from above the upper portion chamber 237, and the lock protrusions 238a of the circumferential wall portions 238 are inserted into the respective lock holes 249a of the side wall portions 249.

Next, the upper ends of the respective vertical plate portions 245b are inserted into the lock protrusions 238a projecting from the side wall portions 249, while the bolts 231a are inserted into the respective horizontal plate portions 245a, so that the pressing plates 245 and 245 are disposed in front and rear portions of the case 236. Further, the nuts 231b are screwed down to the respective bolts 231a. Thus, the air bag system M1 can be assembled.

Then, the passenger seat air bag system M1 assembled thus is inserted into the aperture 202 of the instrument panel 201 which is attached to the vehicle. The respective lock feet 248c are locked in the flange portion 203 while the bolt 206 is screwed down to the nut 243a through the bracket 205b so that the case 236 is connected with the body 205. Thus, the air bag system M1 can be mounted on the vehicle.

If the inflating gas is discharged after the air bag system M1 is mounted on the vehicle, the air bag 210 is inflated so as to rupture not only the wrapping sheet 232 but also the rupture presumptive portion 248b of the air bag cover 247. As a result, the door portions 248a and 248a are opened as shown by the two-dot chain lines in FIGS. 16 and 17. Thus, the air bag 210 projects from the case upper portion chamber 237 on a large scale.

Figure 22:
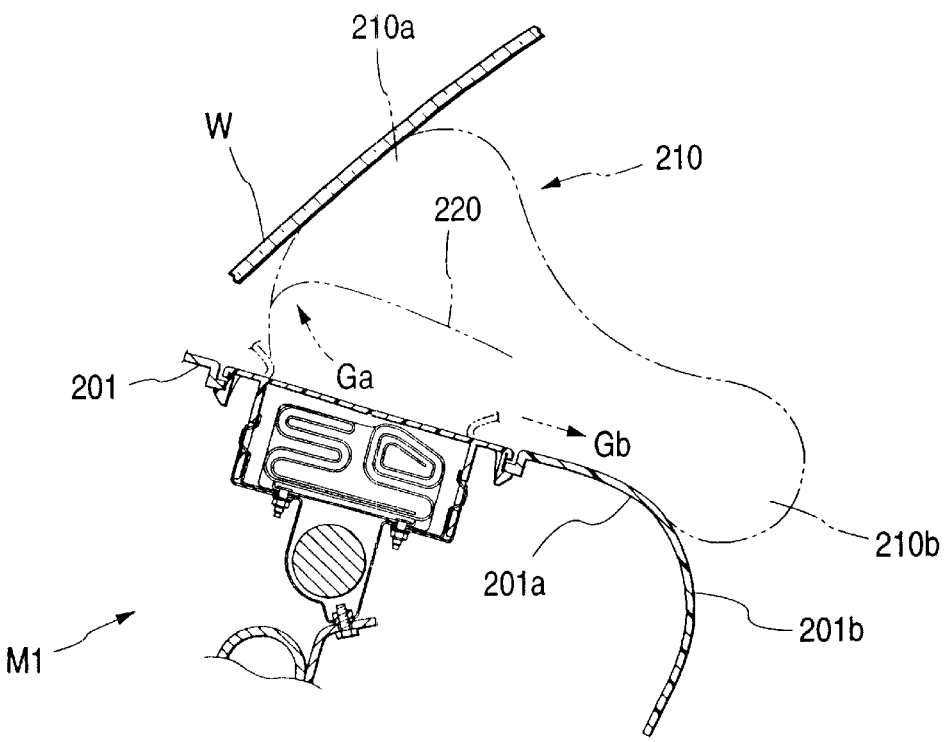
FIG. 22 shows a view for explaining a state where the air bag in the same embodiment is inflated after FIG. 21.
Figure 23:
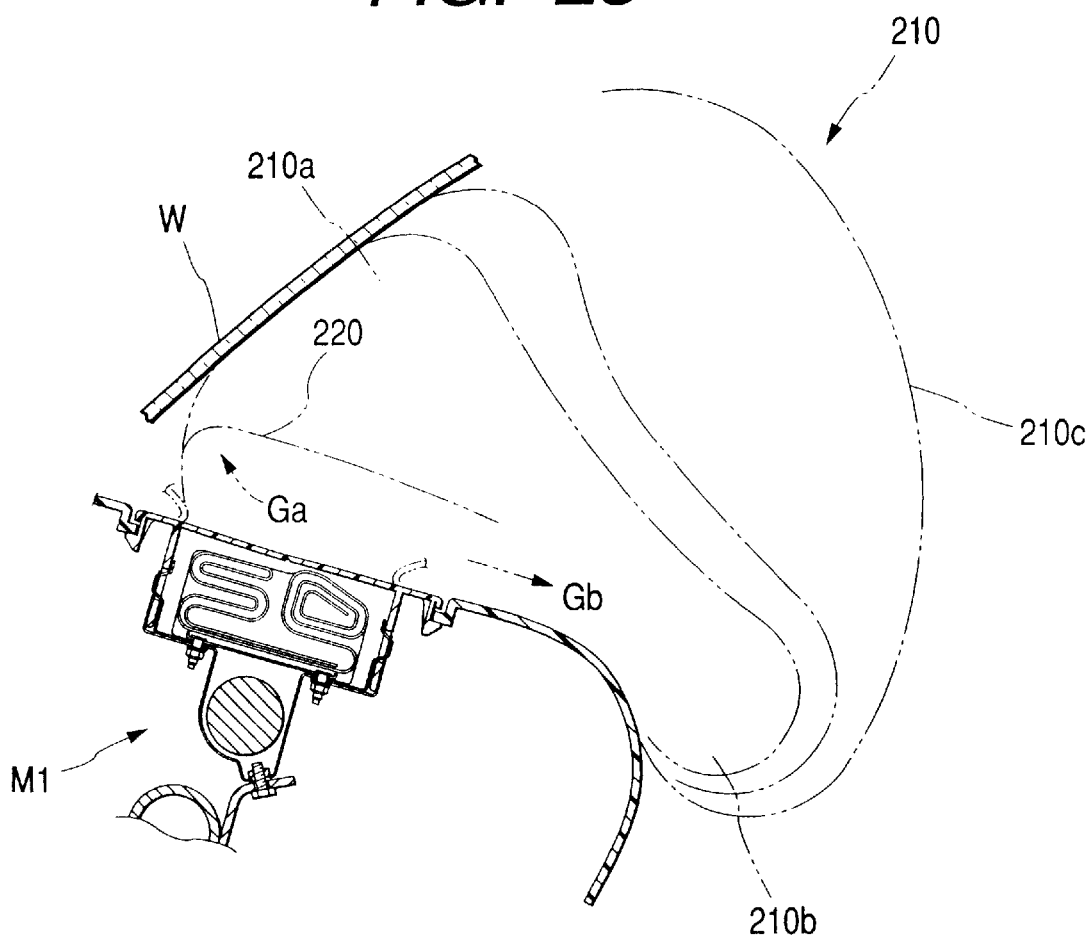
FIG. 23 shows a view for explaining a state where the air bag in the same embodiment is inflated after FIG. 22.
Figure 24:
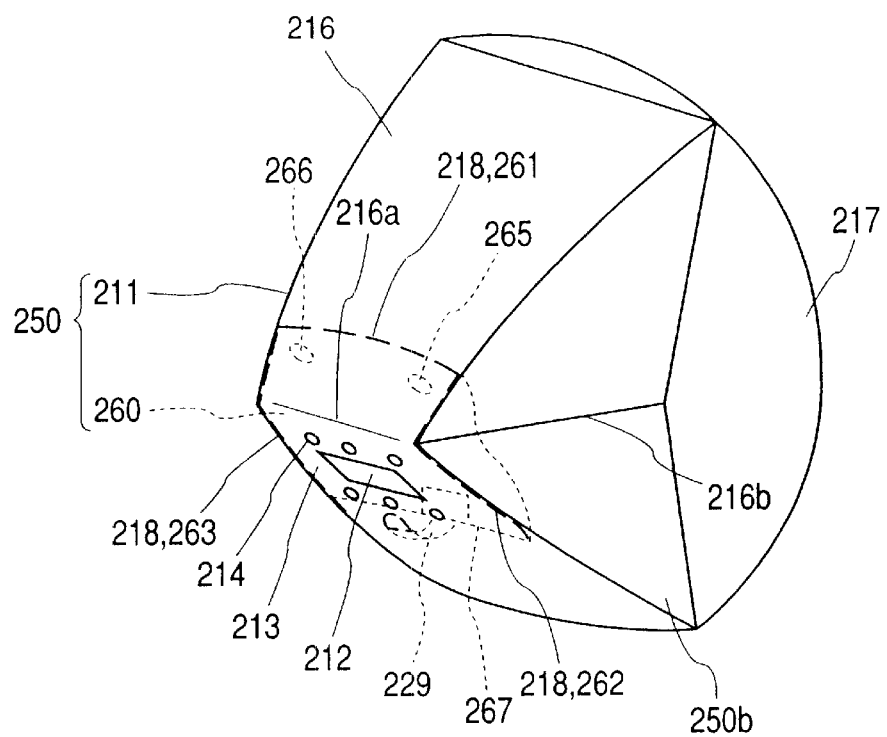
FIG. 24 shows a perspective view showing a state where an air bag in a fifth embodiment is inflated independently.
Figure 25:
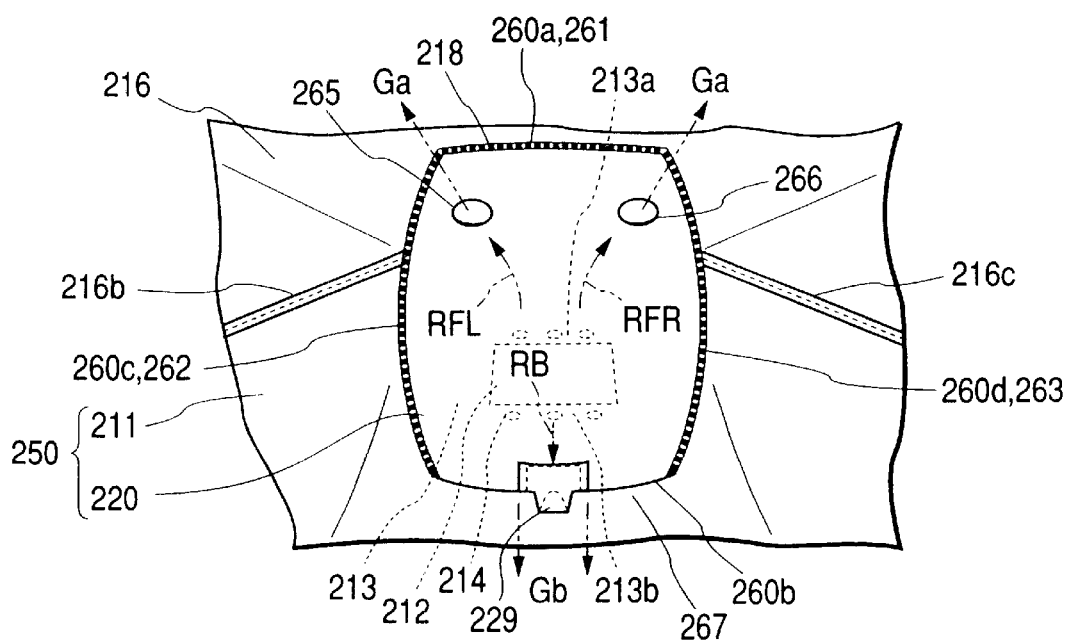
FIG. 25 shows a view in which the gas inlet side of the air bag in the same embodiment is viewed from the inside of the air bag in the state where the air bag is inflated independently.
Figure 26:
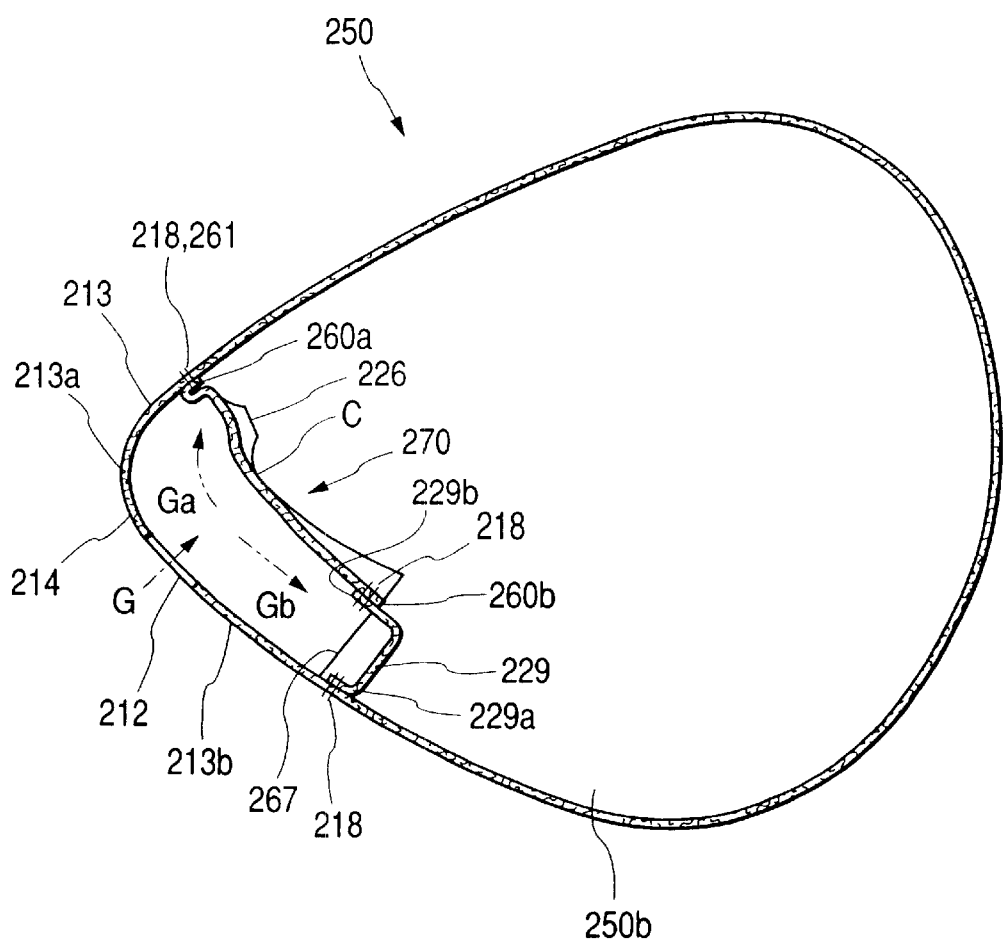
FIG. 26 shows a longitudinally sectional view in the front/rear direction in the state where the air bag in the same embodiment is inflated independently.

Then, in the air bag 210 according to this embodiment, the flow control cloth 220 is disposed in the left/right direction of the vehicle so as to cover the gas inlet 212. As a result, when the air bag 210 is unfolded and inflated, with respect to the substantially middle portion C in the front/rear direction of the flow control cloth 220 opposite to the vicinity of the center of the gas inlet 212, the flow rate of the inflating gas Gb flowing backward is higher than the flow rate of the inflating gas Ga flowing forward. Accordingly, as shown in FIGS. 21 to 23, the lower portion 210b of the air bag 210 deploys along the rear surface 201b of the instrument panel 201 from the upper surface 201a thereof.

Thus, the passenger seat air bag 210 according to this embodiment can be unfolded quickly along the passenger seat side surfaces 201a and 201b of the instrument panel 201 at the beginning when the air bag 210 is unfolded and inflated. Not to say, the inflating gas Ga flows forward from the flow control cloth 220 (in this embodiment, forward upward in the left/right direction) though the flow rate thereof is lower than that of the inflating gas Gb. Accordingly, the upper portion 210a of the air bag 210 moves backward along a wind shield W so that a passenger side surface 210c is disposed in a substantially vertical direction immediately before the inflating is finished.

Particularly, in the air bag 210 according to the embodiment, the flow control cloth 220 couples substantially the three sides, that is, the front, left and right connecting portions 221, 222 and 223 except the rear edge 220b, with the first base cloth 216 of the air bag body 211 except the gas communication holes 225 and 226 near the left and right edges 220c and 220d on the front edge 220a. Accordingly, at the beginning when the air bag 210 is unfolded and inflated, the flow control cloth 220 is first inflated like a bag, and next a large quantity of the inflating gas Gb flows toward the lower portion 210b side of the air bag 210 through the gas communication hole 227 on the rear edge 220b of the flow control cloth 220. At that time, as shown in FIG. 21, the door portions 248a of the air bag cover 248 covering the folded air bag 210 can be opened smoothly when the flow control cloth 220 is inflated like a bag. Next, in that state, a large quantity of the inflating gas Gb flows toward the air bag lower portion 210b. Thus, as shown in FIG. 22, the air bag lower portion 210b deploys along the rear surface 201b of the instrument panel 201 from the top surface 1a thereof more easily. As a result, at the beginning when the air bag 210 is unfolded and inflated, the air bag 210 can be unfolded more quickly along the passenger seat side surfaces 201a and 201b of the instrument panel 201.

The flows of the inflating gases Ga and Gb will be described in the air bag 210 according to the fourth embodiment. If the inflating gas G is discharged from the inflator 234, the flow control cloth 220 is pressed by the inflating gas G flowing therein so as to leave the gas inlet 212. Thus, three gas flow paths RFL, RFR and RB branching like a trident are formed (see FIG. 17). The gas flow paths RFL and RFR are narrow and communicate with the gas communication holes 225 and 226 near the left and right sides of the front edge 220a. The gas flow path RB is wide and communicating with the rear edge 220b. The inflating gas Gb flowing in the gas flow path RB flows backward along the passenger seat side surfaces 1a and 201b of the instrument panel 201. The inflating gases Ga and Ga flowing in the gas flow paths RFL and RFR flow obliquely upward forward on the outer sides in the left and right direction, respectively.

Further, in the air bag 210 according to the embodiment, the forward movement of the rear edge 22Db of the flow control cloth 220 is restricted by the connecting belt 229 which is connected with the circumferential edge of the gas inlet 212. Accordingly, when the inflating gas G flows in, it is possible to avoid such a state that the flow control cloth 220 is turned over forward so as to open the gas inlet 212 directly in the air bag body 211. Thus, the flow rate of the inflating gas Gb flowing backward can be made stably higher than the flow rate of the inflating gas Ga flowing forward.

In an air bag 250 of an air bag system M2 according to a fifth embodiment of the present invention, as shown in FIGS. 24 to 27, a flow control cloth 260 formed into a substantially rectangular shape similarly to that in the fourth embodiment is coupled with a first base cloth 216 of an air bag body 211 having a gas inlet 212 over the whole length of a front edge 260a and the left and right edges 260c and 260d by use of sewing yarn 218. In addition, gas communication holes 265 and 266 are provided on the left and right sides 260c and 260d near the front edge 260a of the flow control cloth 260 itself. Each of the gas communication holes 265 and 266 is open in the form of a circle, and allows inflating gas Ga flowing toward the front side of a substantially middle portion C of the flow control cloth 260 to pass therethrough. In addition, a gas communication hole 267 is provided between the flow control cloth rear edge 260b and the base cloth 216. The gas communication hole 267 allows inflating gas Gb flowing toward the rear side of the substantially middle portion C to pass therethrough.

Not to say, as for the flow rates of the inflating gases Ga and Gb passing through the respective gas communication holes 265 to 267 when the air bag 250 is unfolded and inflated, the aperture areas of the respective gas communication holes 265 to 267 are set so that the flow rate passing through the gas communication hole 267 becomes higher than the total amount of the flow rates passing through the gas communication holes 265 and 266. Further, in this embodiment, the gas communication holes 265 and 266 are set so as to have substantially the same flow rate of the inflating gas Ga passing therethrough.

In addition, also in this air bag 250, a connecting belt 229 is disposed between the vicinity of the center of the rear edge 260b of the flow control cloth 260 and a rear edge 213b of an aperture circumferential edge 213 in the first base cloth 216 of the air bag body 211.

Figure 27:
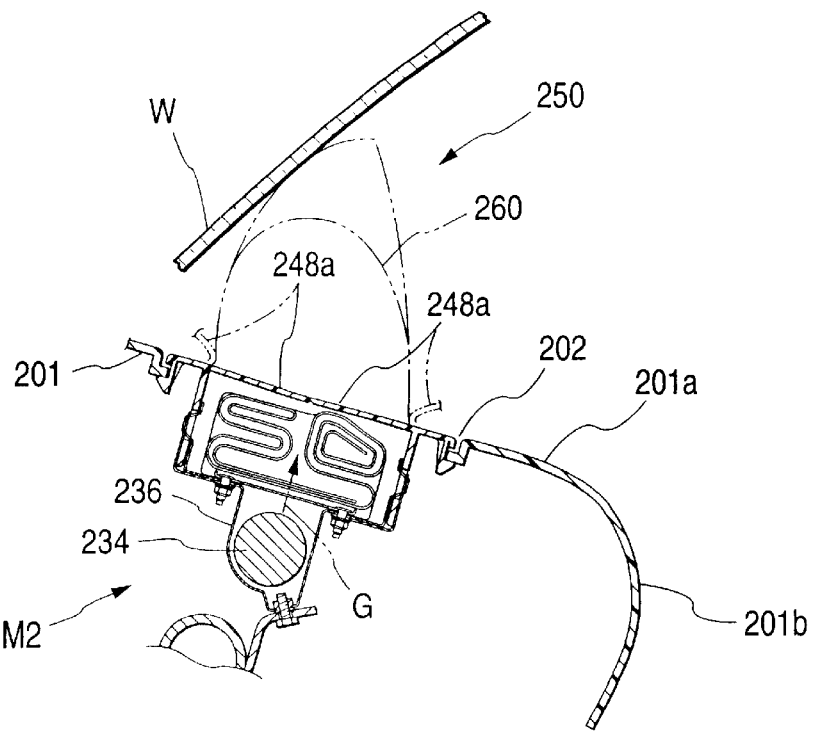
FIG. 27 shows a view for explaining a state where the air bag in the same embodiment is inflated.
Figure 28:
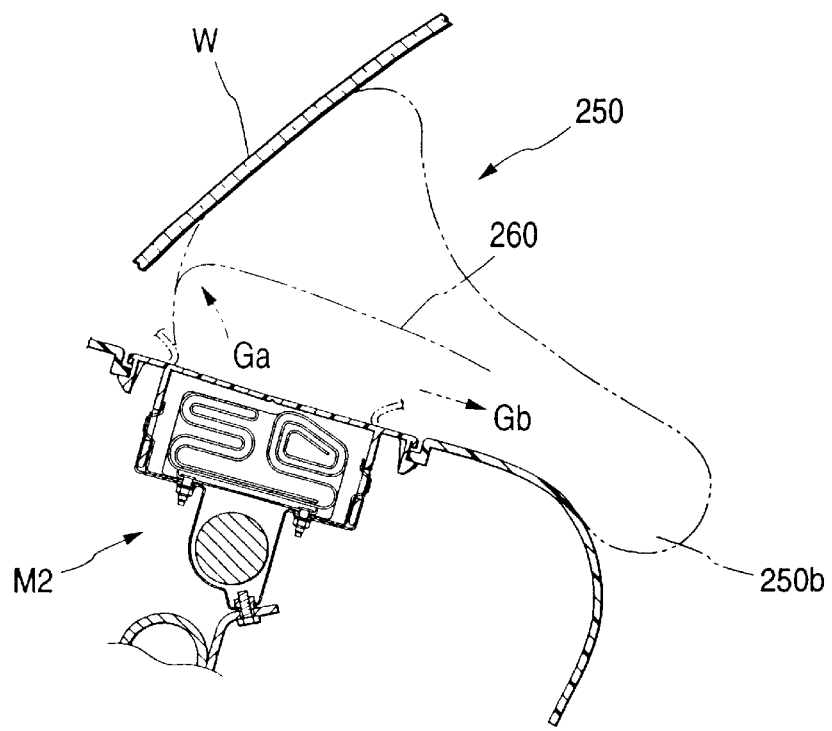
FIG. 28 shows a view for explaining a state where the air bag in the same embodiment is inflated after FIG. 27.
Figure 29:
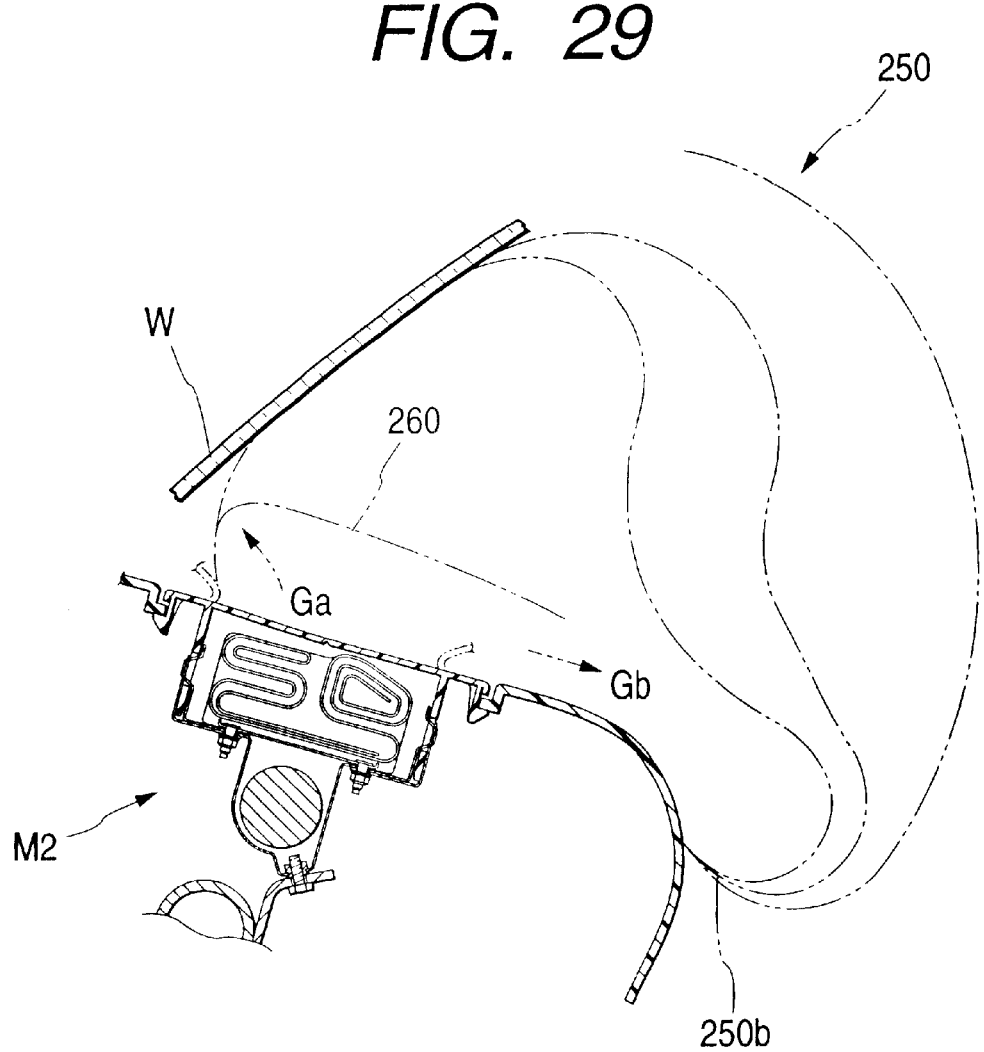
FIG. 29 shows a view for explaining a state where the air bag in the same embodiment is inflated after FIG. 28.
Figure 30:
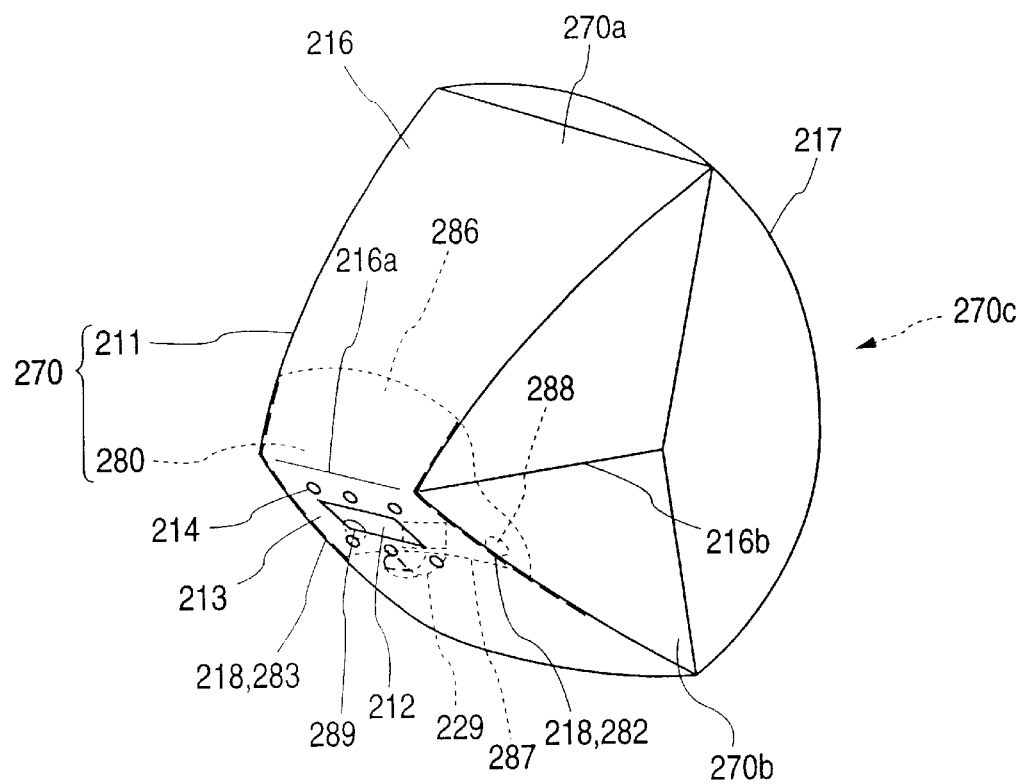
FIG. 30 shows a perspective view showing a state where an air bag in a sixth embodiment is inflated independently.
Figure 31:
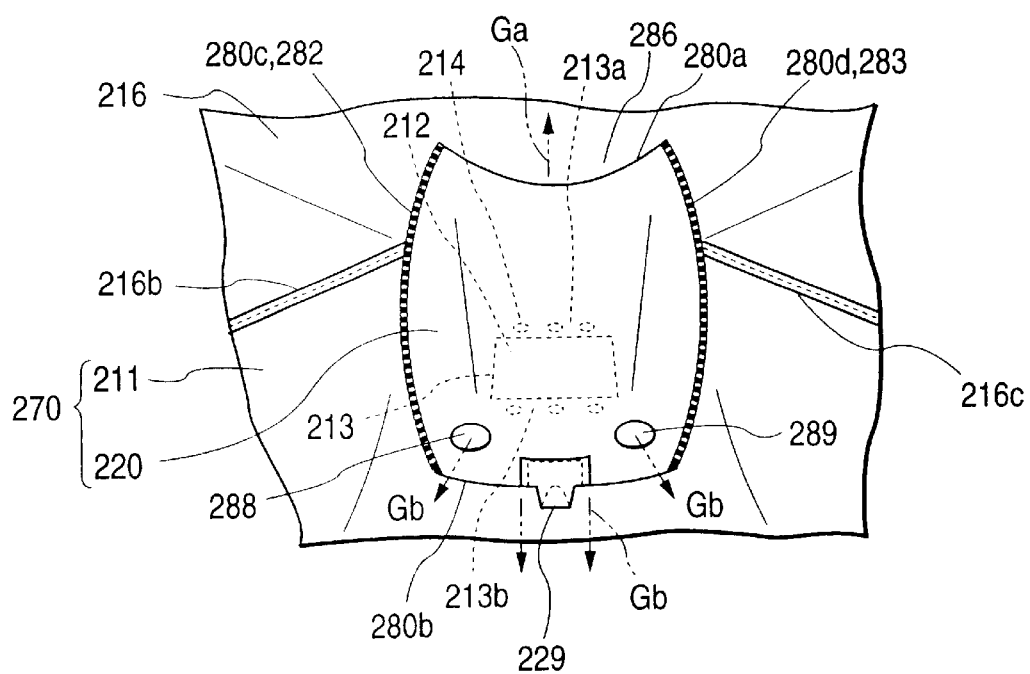
FIG. 31 shows a view in which the gas inlet side of the air bag in the same embodiment is viewed from the inside of the air bag in the state where the air bag is inflated independently.
Figure 32:
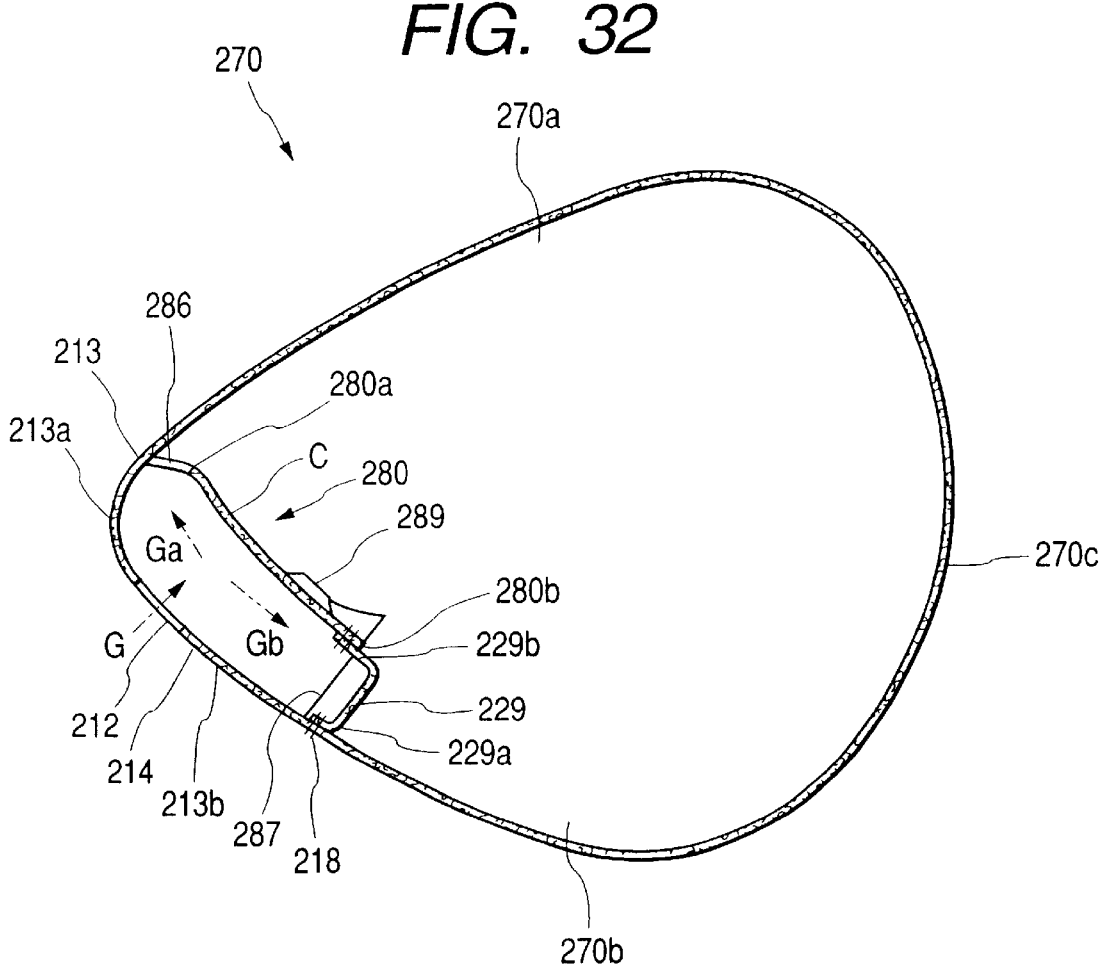
FIG. 32 shows a longitudinally sectional view in the front/rear direction in the state where the air bag in the same embodiment is inflated independently.

This air bag 250 is manufactured and mounted on a vehicle in the same manner as in the fourth embodiment. The flow control cloth 260 is coupled the three sides, that is, the front, left and right connecting portions 261, 262 and 263 except the rear edge 260b, with the first base cloth 216 of the air bag body 211 except the gas communication holes 265 and 266 near the left and right sides on the front edge 260a. Accordingly, if the inflating gas G flows in through the gas inlet 212 after the air bag system M2 is mounted on the vehicle, at the beginning when the air bag 250 is unfolded and inflated, the flow control cloth 260 is first inflated like a bag as shown in FIG. 27. Next, a large quantity of the inflating gas Gb flows toward the lower portion 250b side of the air bag 250 through the gas communication hole 267 on the rear edge 260b of the flow control cloth 260 as shown in FIGS. 28 and 29. As shown in FIG. 27, door portions 248a of an air bag cover 248 covering the folded air bag 250 can be opened smoothly when the flow control cloth 260 is inflated like a bag. Next, in that state, a large quantity of the inflating gas Gb flows toward the air bag lower portion 250b side. Thus, the air bag lower portion 250b deploys along a rear surface 201b of an instrument panel 201 from a top surface 201a thereof more easily. As a result, at the beginning when the air bag 250 is unfolded and inflated, the air bag 250 can be unfolded more quickly along the passenger seat side surfaces 201a and 201b of the instrument panel 201.

Particularly, in the fifth embodiment, the three edges 260a, 260c and 260d except the rear edge 260b serve as the connecting portions 261 to 263 over their whole length. Therefore, the flow control cloth 260 can be unfolded like a bag more quickly, and the door portions 248a and 248a can be opened more smoothly.

In addition, since the flow control cloth 260 and the base cloth 216 are connected through the connecting belt 229, the flow control cloth rear edge 260b is not turned over forward. Accordingly, the flow rate of the inflating gas Gb flowing backward can be made stably higher than the flow rate of the inflating gas Ga flowing forward.

The flows of the inflating gases Ga and Gb will be described in the air bag 250 according to the fifth embodiment. In the same manner as in the air bag 210 according to the fourth embodiment, if the inflating gas G is discharged from the inflator 234, the flow control cloth 260 is pressed by the inflating gas G flowing therein so as to leave the gas inlet 212. Thus, three gas flow paths RFL, RFR and RB branching like a trident are formed (see FIG. 25). The gas flow paths RFL and RFR are narrow and communicate with the gas communication holes 265 and 266 near the left and right sides of the front edge 260a. The gas flow path RB is wide and communicating with the rear edge 260b. The inflating gas Gb flowing in the gas flow path,RB flows backward along the passenger seat side surfaces 201a and 201b of the instrument panel 201. The inflating gases Ga and Ga flowing in the gas flow paths RFL and RFR flow obliquely forward on the outer sides in the left and right direction, respectively.

In an air bag 270 of an air bag system M3 according to a sixth embodiment, as shown in FIGS. 30 to 33, a flow control cloth 280 formed into a substantially rectangular shape similarly to that in the fourth or fifth embodiment is disposed so that the flow rate of inflating gas Gb flowing toward the rear side of a substantially middle portion C in the front/rear direction of the flow control cloth 280 is made higher than the flow rate of inflating gas Ga flowing toward the front side thereof.

In addition, in this embodiment, the flow control cloth 280 is provided so that a front edge 280a and a rear edge 280b are not coupled with a first base cloth 216 of an air bag body 211 while respective left and right edges 280c and 280d serves as coupling portions 282 and 283 to be coupled with an aperture circumferential edge 213 over the whole length of the left and right edges, 280c and 280d by use of sewing yarn 218. Further, the flow control cloth 280 is provided with gas communication holes 288 and 289 in the left and right sides 280c and 280d on the rear edge 280b of the flow control cloth 280 itself. Each of the gas communication holes 288 and 289 is open in the form of a circle and allows the inflating gas Gb to pass therethrough. A gas communication hole 286 which allows the inflating gas Ga to flow therethrough is formed between the front edge 280a of the flow control cloth and the first base cloth 216. A gas communication hole 287 which allows the inflating gas Gb to flow therethrough is formed between the rear edge 280b and the first base cloth 216. In this embodiment, the aperture areas of the gas communication holes 288 and 289 are set to be substantially equal to each other.

In addition, also in the air bag 270, a connecting belt 229 is disposed between the vicinity of the center of the rear edge 280b of the flow control cloth 280 and a rear edge 213b of the aperture circumferential edge 213 in the first base cloth 216 of the air bag body 211.

Figure 33:
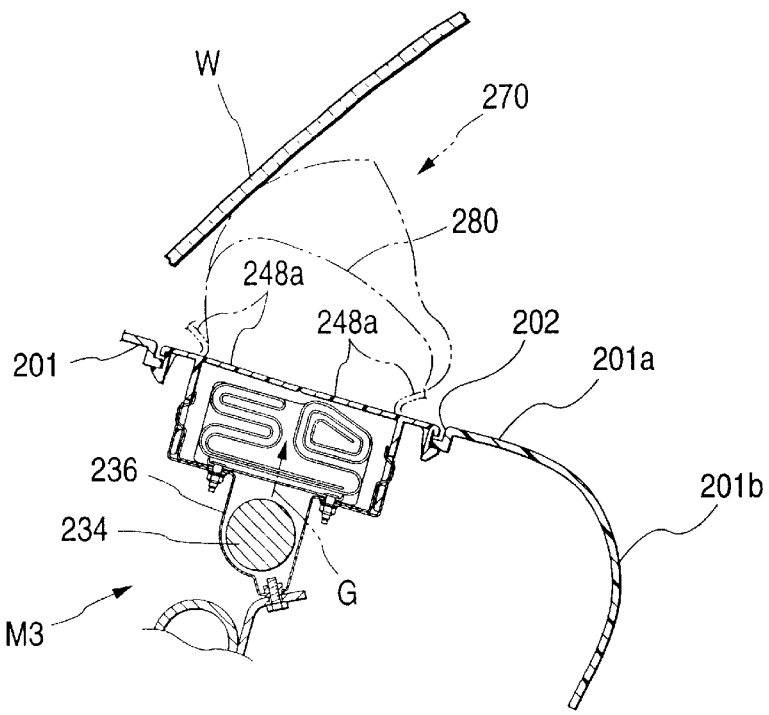
FIG. 33 shows a view for explaining a state where the air bag in the same embodiment is inflated.
Figure 34:
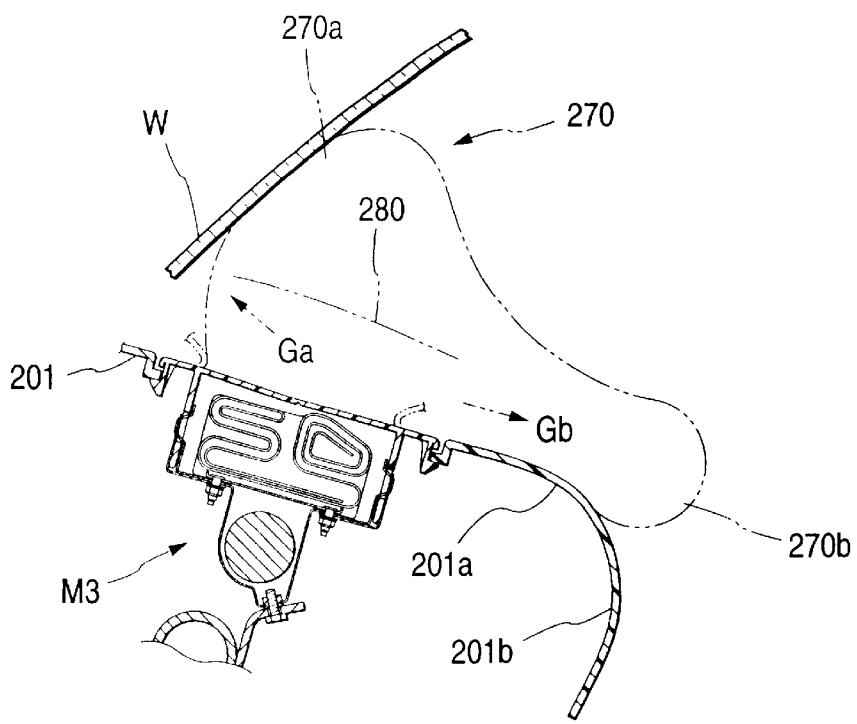
FIG. 34 shows a view for explaining a state where the air bag in the same embodiment is inflated after FIG. 33.
Figure 35:
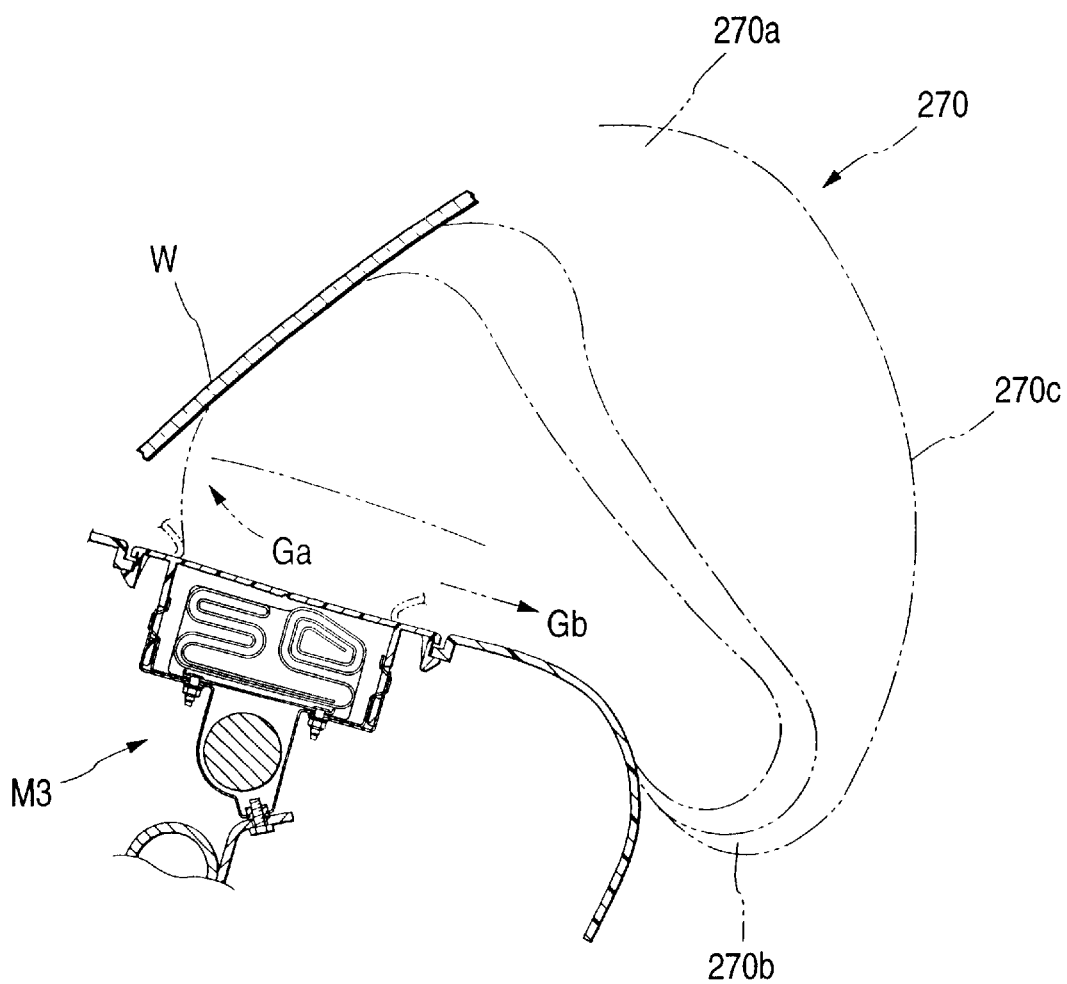
FIG. 35 shows a view for explaining a state where the air bag in the same embodiment is inflated after FIG. 34.
Figure 36:
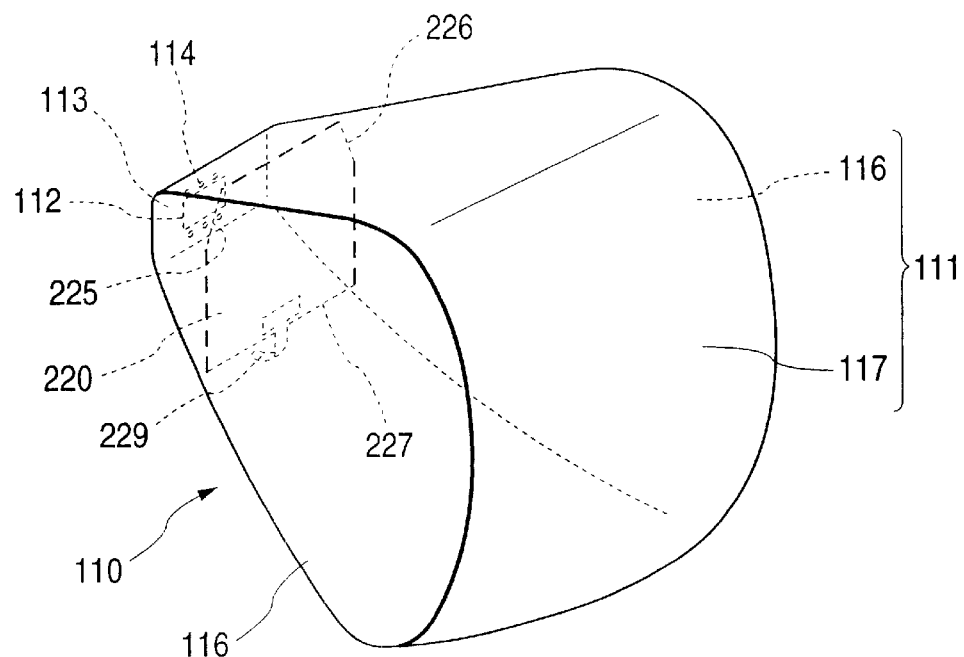
FIG. 36 shows a perspective view showing a state where an air bag in a seventh embodiment is inflated independently.
Figure 37:
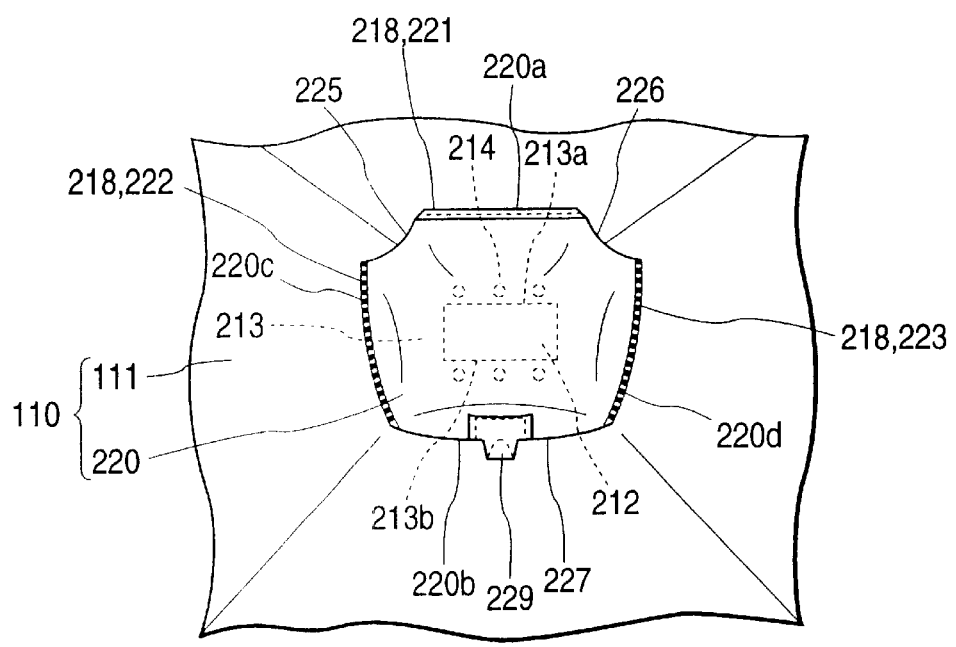
FIG. 37 shows a view in which the gas inlet side of the air bag in the same embodiment is viewed from the inside of the air bag in the state where the air bag is inflated independently.

This air bag 270 is manufactured and mounted on a vehicle in the same manner as in the fourth or fifth embodiment. The flow control cloth 280 is disposed in the left/right direction of the vehicle so as to cover the gas inlet 212. Accordingly, if inflating gas G flows in through the gas inlet 212 after the air bag system M3 is mounted on the vehicle, the flow rate of the inflating gas Gb flowing toward the rear side of a substantially middle portion C in the front/rear direction of the flow control cloth 280 opposite to the vicinity of the center of the gas inlet 212 is higher than the flow rate of the inflating gas Ga flowing toward the front side thereof. Thus, when the air bag 280 is unfolded and inflated, the lower portion 280b of the air bag 280 deploys along a rear surface 1b of an instrument panel 1 from a top surface 1a thereof, as shown in FIGS. 33 to 35.

Thus, the passenger seat air bag 270 according to the embodiment can be unfolded quickly along the passenger seat side surfaces 201a and 201b of the instrument panel 201 at the beginning when the air bag 270 is unfolded and inflated. Not to say, the inflating gas Ga flows forward (forward upward in this embodiment) from the flow control cloth 280 though the flow rate thereof is lower than that of the inflating gas Gb. Accordingly, the upper portion 70a of the air bag 270 moves backward along a wind shield W so that a passenger side surface 270c is disposed in a substantially vertical direction immediately before the inflating is finished.

Particularly, the gas communication holes 288 and 289 which allow the inflating gas Gb to pass therethrough are disposed in the left and right edges 280c and 280d on the rear edge 280b of the flow control cloth 280 itself. Accordingly, at the beginning when the air bag 270 is unfolded and inflated, the air bag 270 can be unfolded with a broad width in the left/right direction when a lower portion 270b of the air bag 270 is deployed along the rear surface 201b of the instrument panel 201 from the top surface 1a thereof by the inflating gas Gb which passes through the left and right gas communication holes 288 and 289 and flows backward on the outer sides in the left/right direction.

In addition, since the flow control cloth 280 and the base cloth 216 are connected through the connecting belt 229, the flow control cloth rear edge 280b is not turned over forward. Accordingly, the flow rate of the inflating gas Gb flowing backward can be made larger than the flow rate of the inflating gas Ga flowing forward in a stable state.

Incidentally, although the air bags 210, 250 and 270 which could be manufactured in a cubic form by planar sewing were shown in the fourth to sixth embodiments, the flow control cloths 220, 260 and 280 may be disposed in a cubic air bag body 111 having a substantially square cylindrical shape such as air bags 110, 150 and 170 according to seventh to ninth embodiments shown in FIGS. 36 to 41.

Incidentally, the air bag body 111 is constituted by three base cloths in all, that is, two small base cloths 116 and 116 which form left and right side walls, and a large base cloth 117 which forms a ceiling wall opposed to the gas inlet 112, a front side wall and a rear side wall. Then, the aperture circumferential edge 113 of the gas inlet 112 is provided to extend from at least one of the small and large base cloths 116 and 117.

In the air bag 110 according to the seventh embodiment, a flow control cloth 220 similar to that in the fourth embodiment is provided so that a rear edge 220b of the flow control cloth 220 is not coupled with the large base cloth 117 of the air bag body 111 while left and right edges 220c and 220d and a front edge 220a are coupled with the large base cloth 117 or the small base cloths 116 and 116 at the circumferential edge of the gas inlet 112 in the inner circumferential surface of the air bag body 111 by use of sewing yarn 218.

Also in this air bag 110, operations and effects similar to those in the fourth embodiment can be obtained.

Figure 38:
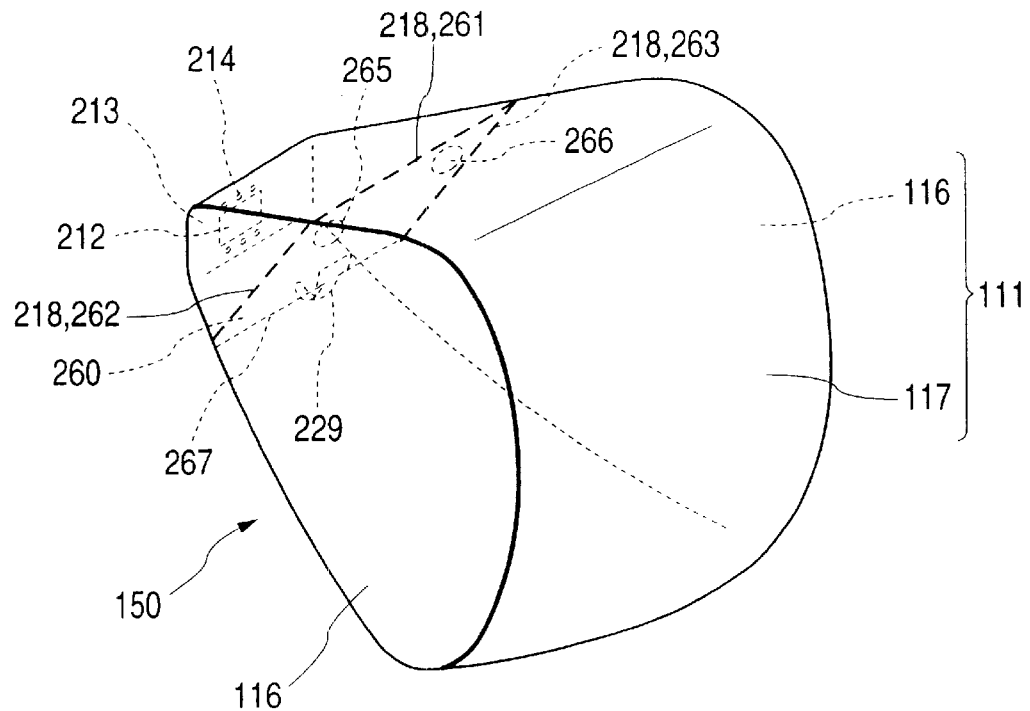
FIG. 38 shows a perspective view showing a state where an air bag in an eighth embodiment is inflated independently.
Figure 39:
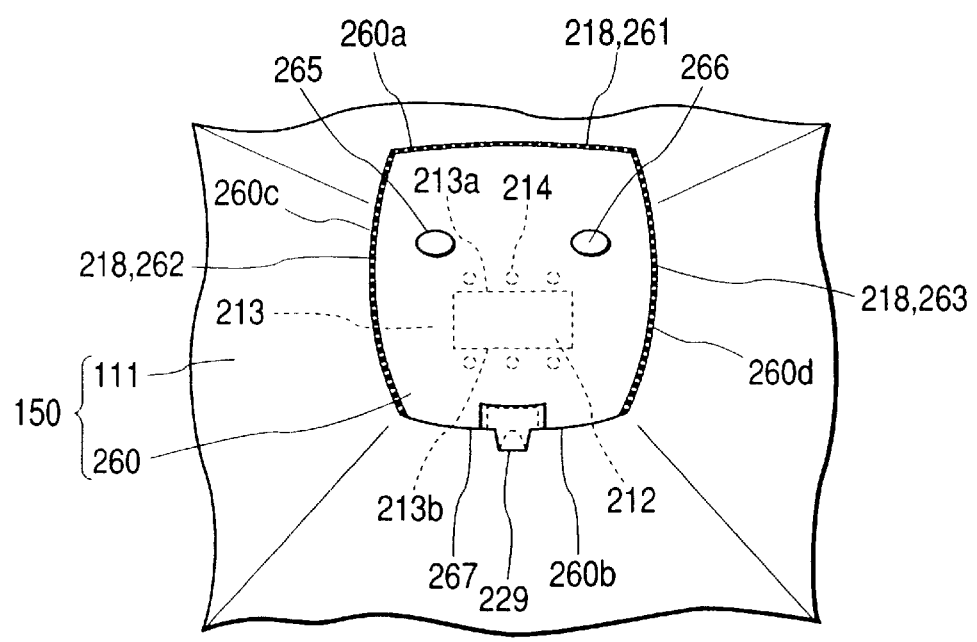
FIG. 39 shows a view in which the gas inlet side of the air bag in the same embodiment is viewed from the inside of the air bag in the state where the air bag is inflated independently.

In the air bag 150 according to the eighth embodiment, as shown in FIGS. 38 and 39, a flow control cloth 260 similar to that in the fifth embodiment is provided so that the whole length of a front edge 260a and left and right edges 260c and 260d except a rear edge 260b are coupled with the circumferential edge of the gas inlet 112 in the inner circumferential surface of the air bag body 111 by use of sewing yarn 218. In addition, in the flow control cloth 260, gas communication holes 265 and 266 are provided on the left and right sides 260c and 260d near the front edge 260a. Each of the gas communication holes 265 and 266 is open in the form of a circle, and allows inflating gas to pass therethrough.

Also in this air bag 150, operations and effects similar to those in the fifth embodiment can be obtained.

Figure 40:
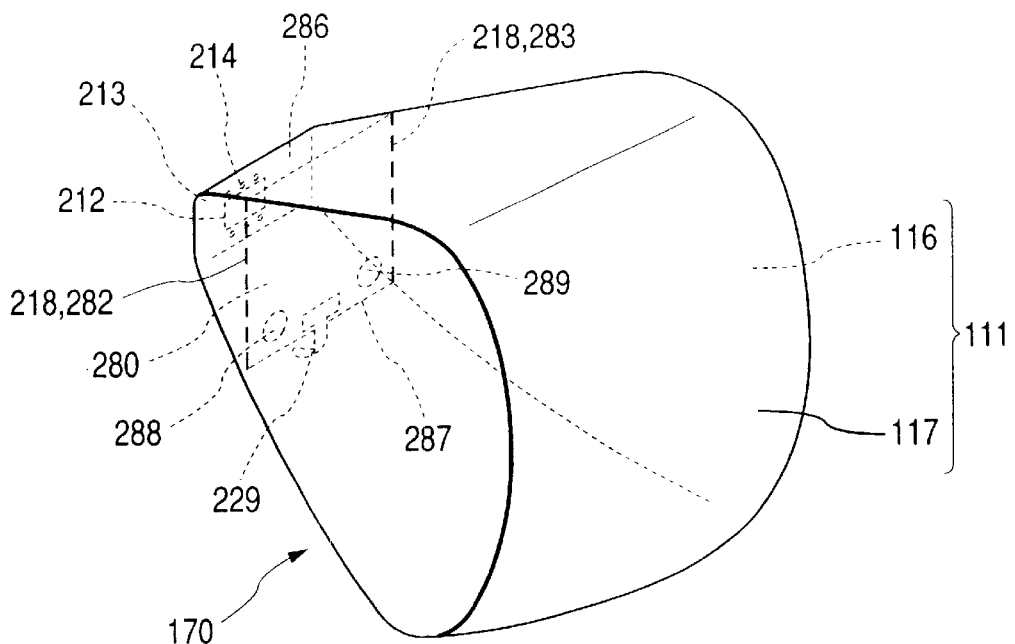
FIG. 40 shows a perspective view showing a state where an air bag in a ninth embodiment is inflated independently.
Figure 41:
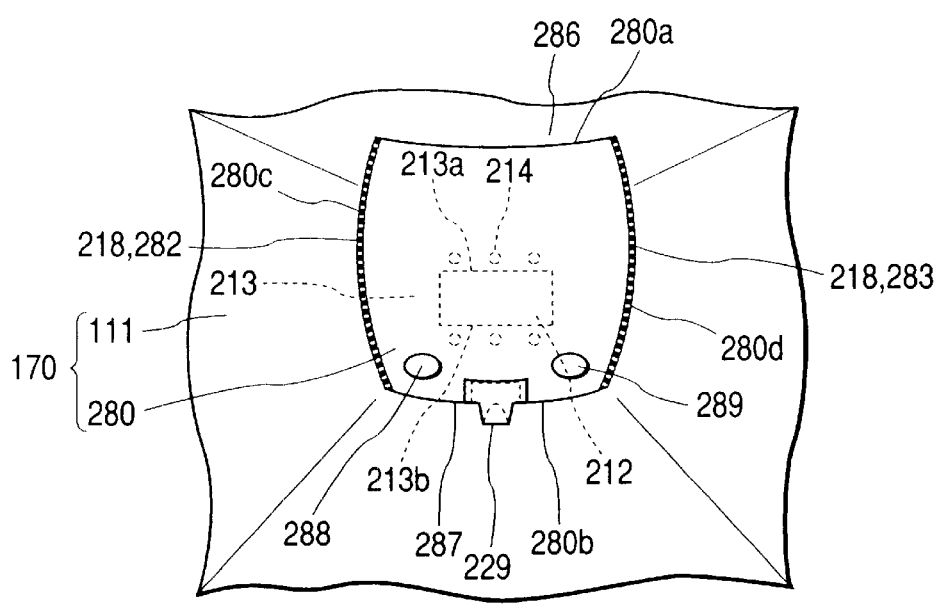
FIG. 41 shows a view in which the gas inlet side of the air bag in the same embodiment is viewed from the inside of the air bag in the state where the air bag is inflated independently.

In the air bag 170 according to the ninth embodiment, as shown in FIGS. 40 and 41, a flow control cloth 280 similar to that in the sixth embodiment is provided so that a front edge 280a and a rear edge 280b are not coupled with the air bag body 111 while left and right edges 280c and 280d are coupled with the circumferential edge of the gas inlet 112 in the inner circumferential surface of the air bag body 111 over the whole length of the left and right edges 280c and 280d by use of sewing yarn 218. Further, the flow control cloth 280 is provided with gas communication holes 288 and 289 in the left and right sides 280c and 280d on the rear edge 280b. Each of the gas communication holes 288 and 289 is open in the form of a circle and allows inflating gas to pass therethrough.

Also in this air bag 170, operations and effects similar to those in the sixth embodiment can be obtained.

This invention is not confined by any of the modes of the above-described embodiments of the invention and the explanation of the embodiments. This invention includes a variety of modifications that do not deviate from the description within the scope of the claims for patent and within the range of simple imagination of these inventors.

What is claimed is:

1. A passenger seat air bag used in a passenger seat air bag system disposed on a top surface of an instrument panel in front of a passenger seat in a vehicle, said air bag system comprising:

an air bag main body;

a gas inlet disposed substantially along a horizontal plane of said air bag main body; and a flow control cloth provided inside said air bag main body to cover said gas inlet for changing a flow of inflating gas allowed to flow in through said gas inlet, wherein said flow control cloth is disposed so as not only to cover said gas inlet in a left and right direction of said vehicle but also to make a flow rate of said inflating gas flowing toward a rear side higher than a flow rate of said inflating gas flowing toward a front side with respect to a substantially middle portion in a front and rear direction of said flow control cloth, wherein, in order to make said flow rate of said inflating gas flowing toward said front side lower than said flow rate of said inflating gas flowing toward said rear side thereof with respect to said substantially middle portion in said front/rear direction of said flow control cloth, said flow control cloth is disposed so that left and right edges of said flow control cloth are coupled with a circumferential edge of said gas inlet in an inner circumferential surface of said air bag body while front and rear edges of said flow control cloth are not coupled with said air bag body, and gas communication holes for allowing said inflating gas to pass therethrough are disposed in said left and right sides of said rear edge of said flow control cloth.

2. A passenger seat air bag used in a passenger seat air bag system disposed on a top surface of an instrument panel in front of a passenger seat in a vehicle, said air bag system comprising:

an air bag main body;

a gas inlet disposed substantially along a horizontal plane of said air bag main body; and a flow control cloth provided inside said air bag main body to cover said gas inlet for changing a flow of inflating gas allowed to flow in through said gas inlet, wherein said flow control cloth is disposed so as not only to cover said gas inlet in a left and right direction of said vehicle but also to make a flow rate of said inflating gas flowing toward a rear side higher than a flow rate of said inflating gas flowing toward a front side with respect to a substantially middle portion in a front and rear direction of said flow control cloth, wherein, in order to make said flow rate of said inflating gas flowing toward said front side lower than said flow rate of said inflating gas flowing toward said rear side thereof with respect to said substantially middle portion in said front/rear direction of said flow control cloth, said flow control cloth is disposed so that left and right edges and a front edge of said flow control cloth are coupled with a circumferential edge of said gas inlet in an inner circumferential surface of said air bag while a rear edge of said flow control cloth is not coupled with said air bag body, and gas communication holes for allowing said inflating gas to pass therethrough are disposed, respectively, between each of said left and right edges of said flow control cloth near said front edge and said air bag body or in vicinities of left and right sides near said front edge of said flow control cloth itself.

3. A passenger seat air bag used in a passenger seat air bag system disposed on a top surface of an instrument panel in front of a passenger seat in a vehicle, said air bag system comprising:

an air bag main body;

a gas inlet disposed substantially along a horizontal plane of said air bag main body; and a flow control cloth provided inside said air bag main body to cover said gas inlet for changing a flow of inflating gas allowed to flow in through said gas inlet, wherein said flow control cloth is disposed so as not only to cover said gas inlet in a left and right direction of said vehicle but also to make a flow rate of said inflating gas flowing toward a rear side higher than a flow rate of said inflating gas flowing toward a front side with respect to a substantially middle portion in a front and rear direction of said flow control cloth, wherein a rear edge of said flow control cloth is connected, through a connecting belt, with a rear edge of a circumferential edge of said gas inlet in said air bag body so that forward movement of said inflating gas can be restricted when said inflating gas flows in through said gas inlet, and wherein said connecting belt restricts movement of said flow control cloth.

4. A passenger seat air bag used in a passenger seat air bag system disposed on a top surface of an instrument panel in front of a passenger seat in a vehicle, said air bag system comprising:

an air bag main body;

a gas inlet disposed substantially along a horizontal plane of said air bag main body; and a flow control cloth provided inside said air bag main body to cover said gas inlet for changing a flow of inflating gas allowed to flow in through said gas inlet, wherein said flow control cloth is disposed so as not only to cover said gas inlet in a left and right direction of said vehicle but also to make a flow rate of said inflating gas flowing toward a rear side higher than a flow rate of said inflating gas flowing toward a front side with respect to a substantially middle portion in a front and rear direction of said flow control cloth, wherein the flow control cloth includes one cloth with no seam.

5. A passenger seat air bag used in a passenger seat air bag system disposed on a top surface of an instrument panel in front of a passenger seat in a vehicle, said air bag system comprising:

an air bag main body;

a gas inlet disposed substantially along a horizontal plane of said air bag main body; and a flow control cloth provided inside said air bag main body to cover said gas inlet for changing a flow of inflating gas allowed to flow in through said gas inlet, wherein said flow control cloth is disposed so as not only to cover said gas inlet in a left and right direction of said vehicle but also to make a flow rate of said inflating gas flowing toward a rear side higher than a flow rate of said inflating gas flowing toward a front side with respect to a substantially middle portion in a front and rear direction of said flow control cloth, wherein the flow control cloth is disposed such that a center of the flow control cloth in a front and rear direction of the vehicle is positioned to be offset from a center of the gas inlet into the front direction of the vehicle.

* * * * *